(12) United States Patent
Takai et al.

(10) Patent No.: US 8,873,075 B2
(45) Date of Patent: Oct. 28, 2014

(54) OPERATION DEVICE, IMAGE FORMING APPARATUS, AND OPERATION METHOD STORING ORIENTATION SETTING INFORMATION

(75) Inventors: Kenji Takai, Osaka (JP); Toshimasa Takaoka, Osaka (JP)

(73) Assignee: Kyocera Document Solutions Inc., Osaka-Shi (JP)

( * ) Notice: Subject to any disclaimer, the term of this patent is extended or adjusted under 35 U.S.C. 154(b) by 237 days.

(21) Appl. No.: 13/283,260

(22) Filed: Oct. 27, 2011

(65) Prior Publication Data
US 2012/0105886 A1  May 3, 2012

(30) Foreign Application Priority Data

Oct. 27, 2010 (JP) ................................ 2010-241351
Nov. 26, 2010 (JP) ................................ 2010-263556

(51) Int. Cl.
*G06F 3/12* (2006.01)
*G06F 3/0488* (2013.01)
*G03G 15/00* (2006.01)

(52) U.S. Cl.
CPC .......... *G06F 3/04886* (2013.01); *G03G 15/502* (2013.01)
USPC ............................ 358/1.13; 358/1.1; 358/1.15

(58) Field of Classification Search
USPC .................................................. 358/1.13, 1.1
See application file for complete search history.

(56) References Cited

U.S. PATENT DOCUMENTS

| | | | |
|---|---|---|---|
| 6,624,905 B1 * | 9/2003 | Ikegami et al. | 358/1.13 |
| 2008/0088875 A1 * | 4/2008 | Taira | 358/1.15 |
| 2008/0204778 A1 * | 8/2008 | Koarai | 358/1.9 |
| 2009/0265625 A1 * | 10/2009 | Tamai et al. | 715/274 |

FOREIGN PATENT DOCUMENTS

| | | |
|---|---|---|
| JP | 2003-37696 A | 2/2003 |
| JP | 2008-299228 A | 12/2008 |

* cited by examiner

*Primary Examiner* — Paul F Payer
*Assistant Examiner* — Martin Mushambo
(74) *Attorney, Agent, or Firm* — Knobbe Martens Olson & Bear LLP

(57) ABSTRACT

An operation device including: a touch screen; an orientation setting information storage unit that stores orientation setting information regarding a display orientation of the preview image; an orientation setting information acquisition unit that acquires the orientation setting information from the orientation setting information storage unit when the preview image is displayed on the preview image window in the predetermined display orientation; a tab display acceptance unit that selectably displays a tab key on the preview image window, the tab key including the orientation setting information acquired from the orientation setting information acquisition unit; and a display adjustment unit that displays the tab key seamlessly with the preview image on the touch screen, the tab key including the orientation setting information corresponding to the display orientation of the preview image displayed on the preview image window.

18 Claims, 32 Drawing Sheets

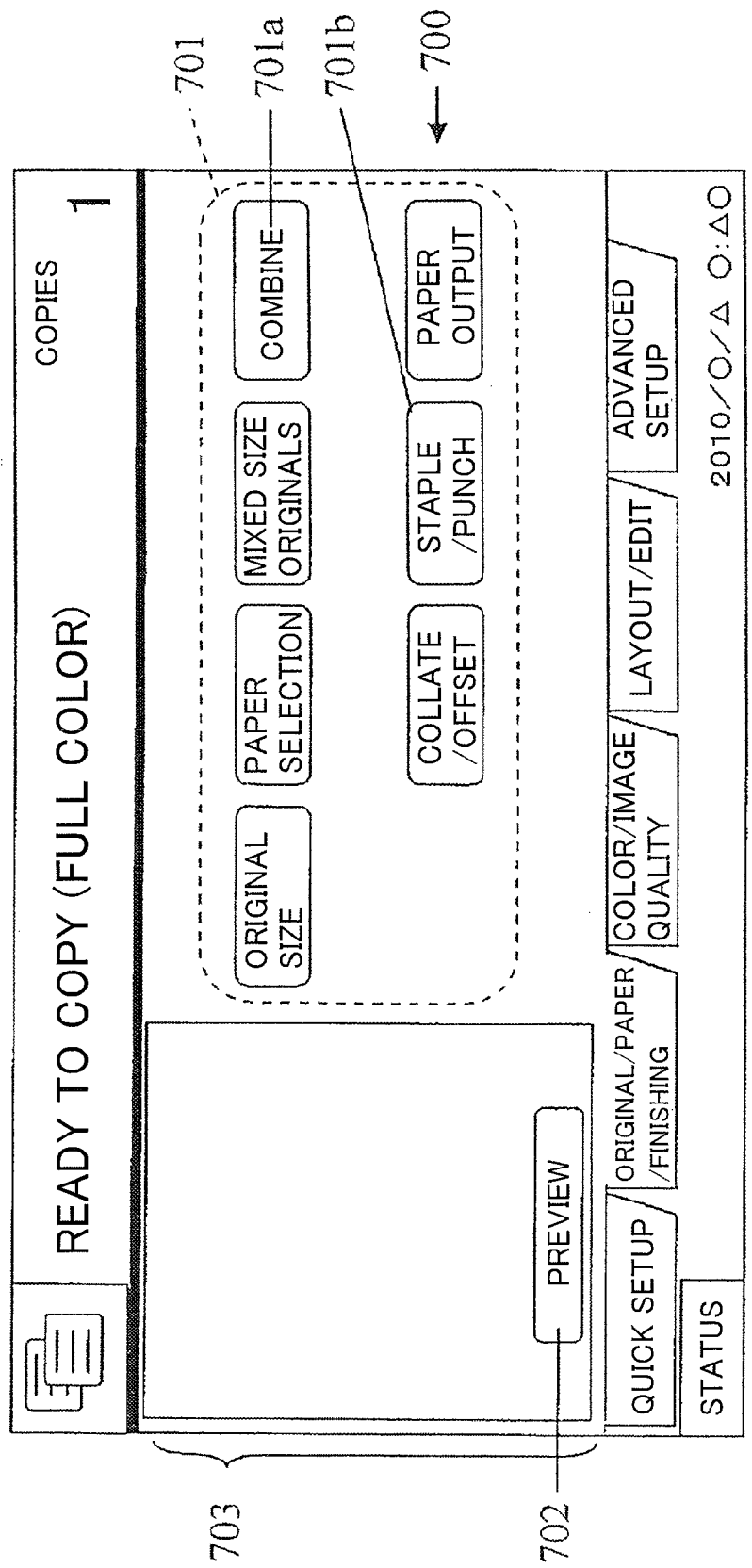

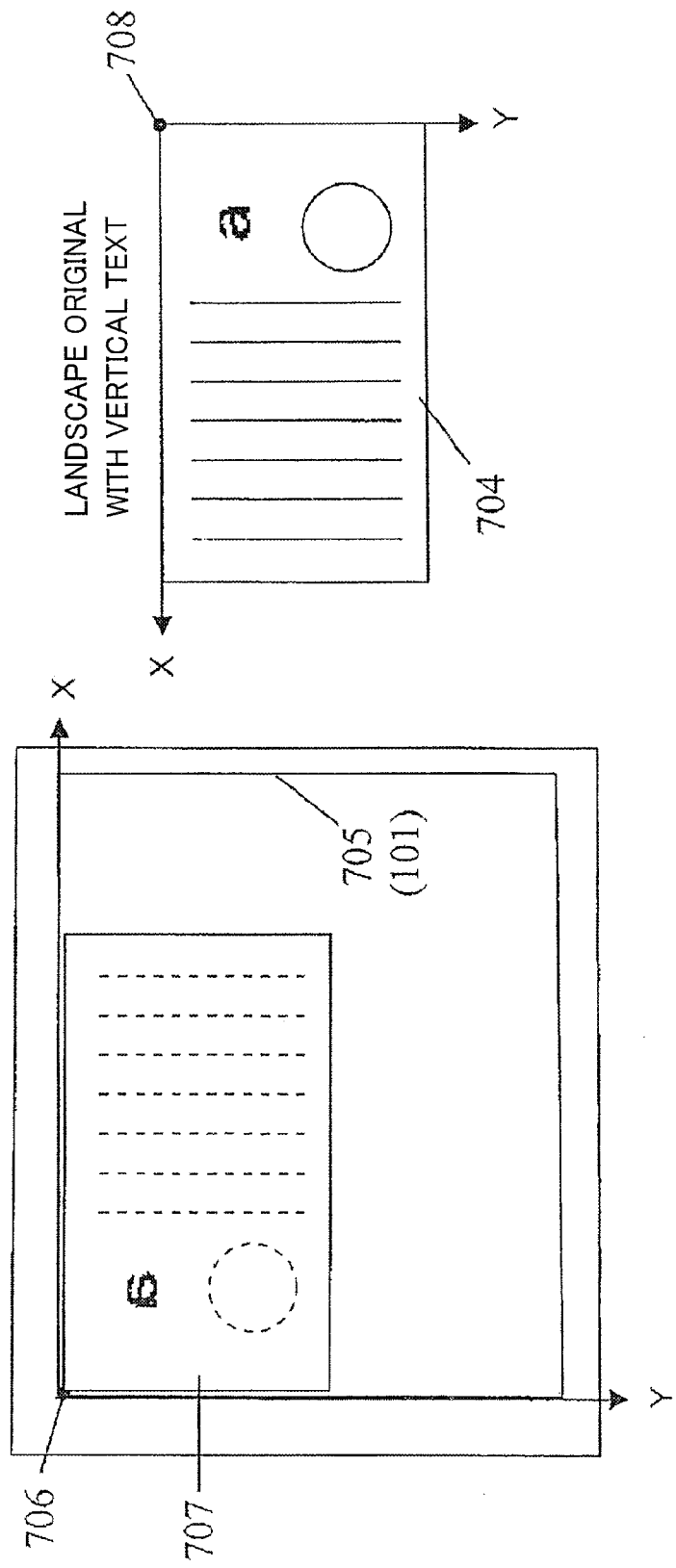

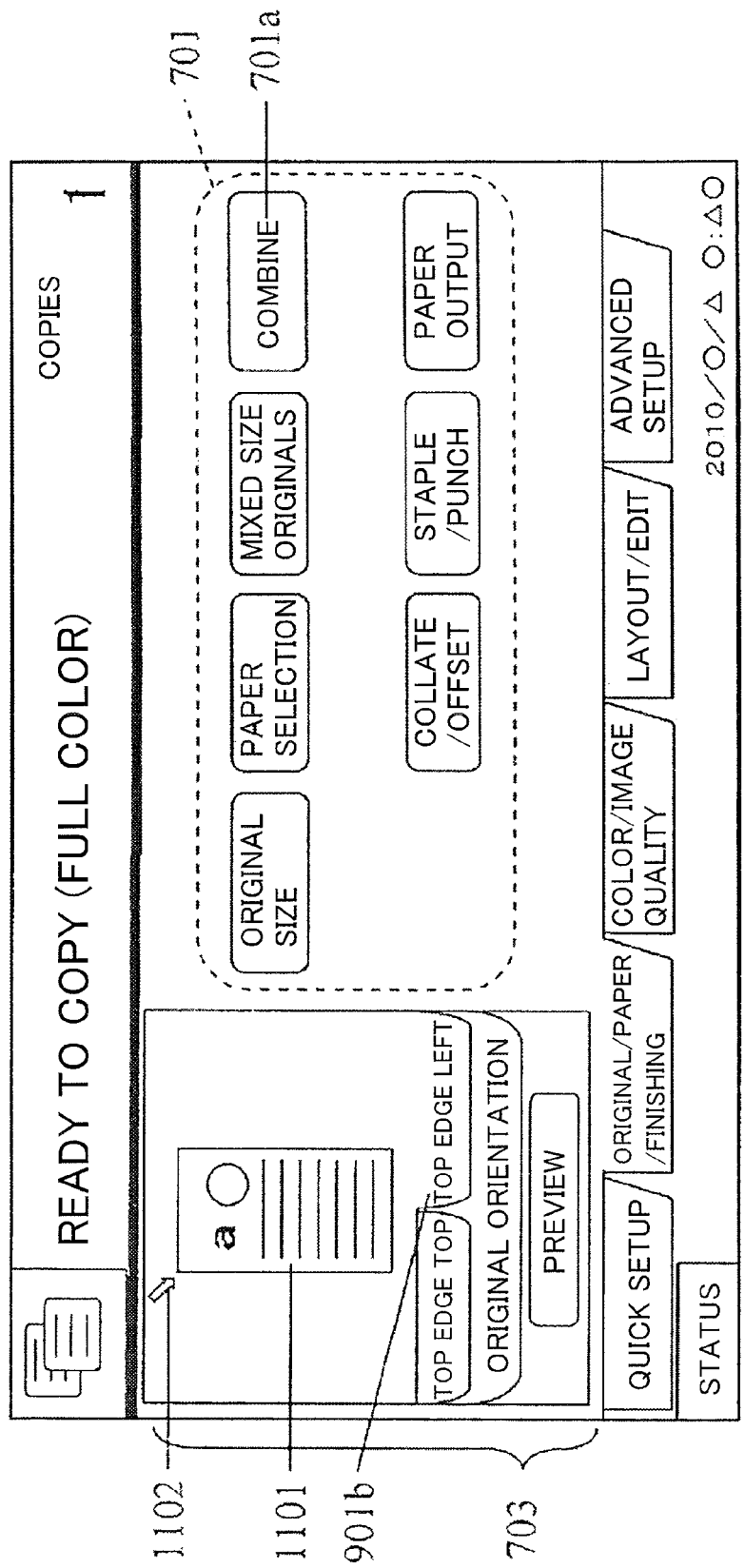

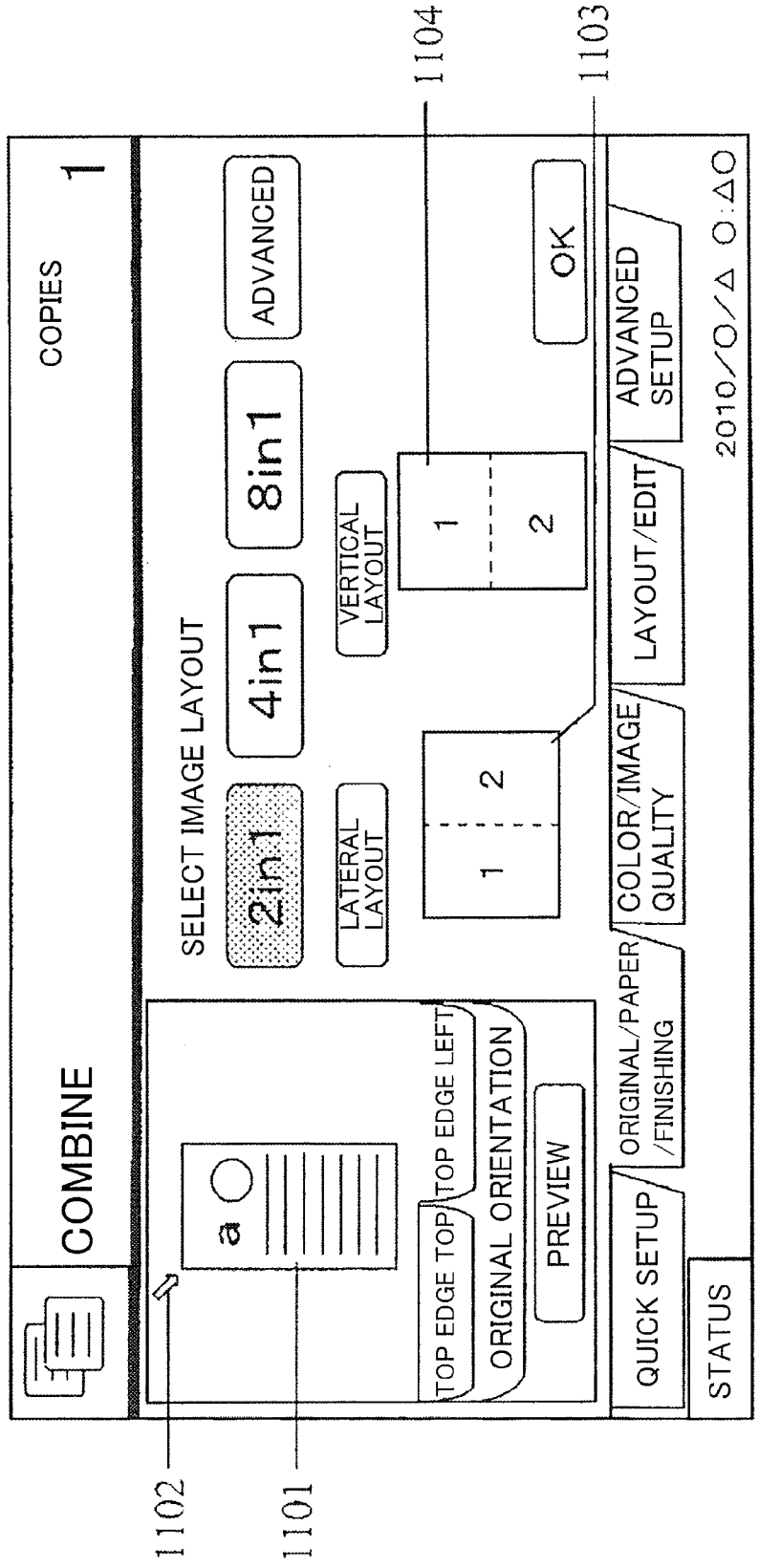

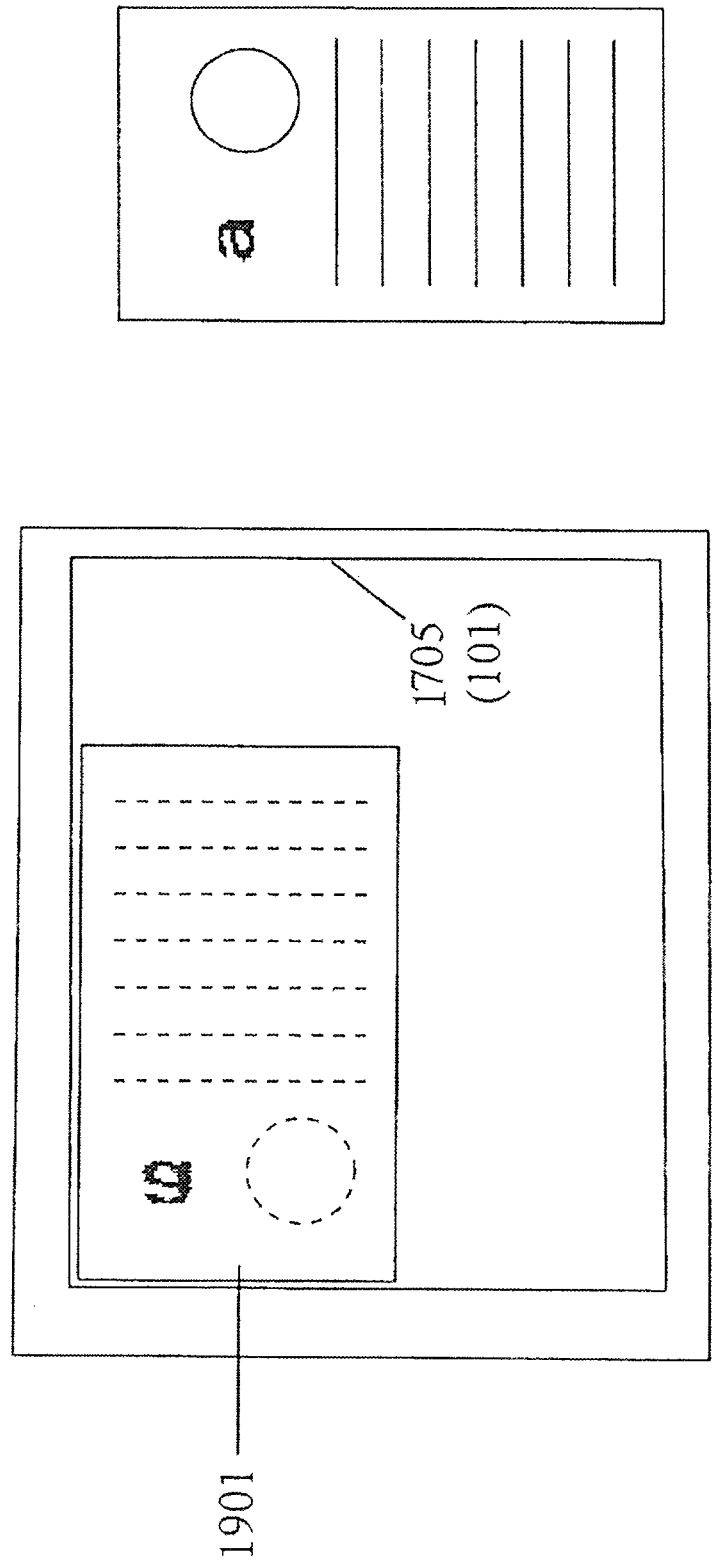

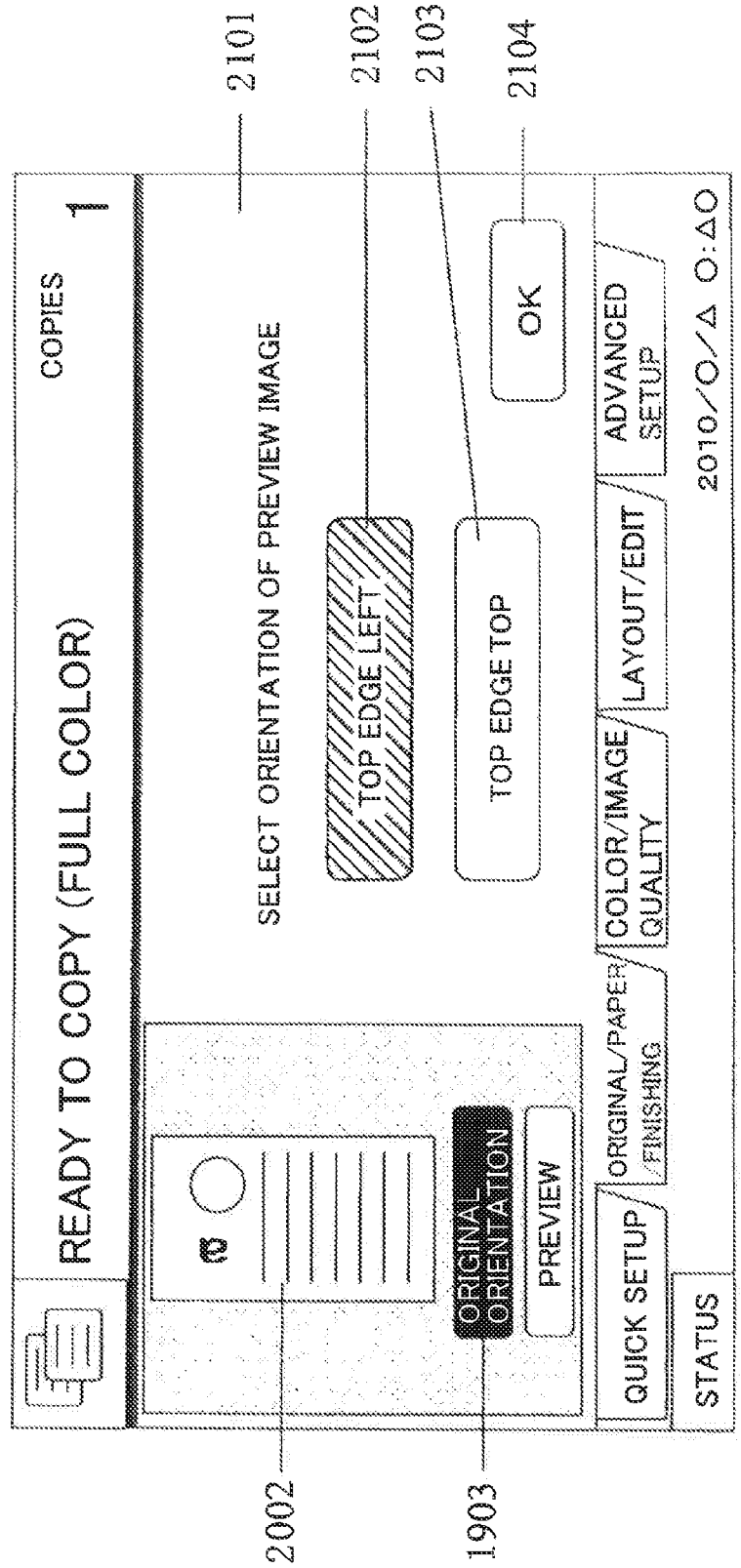

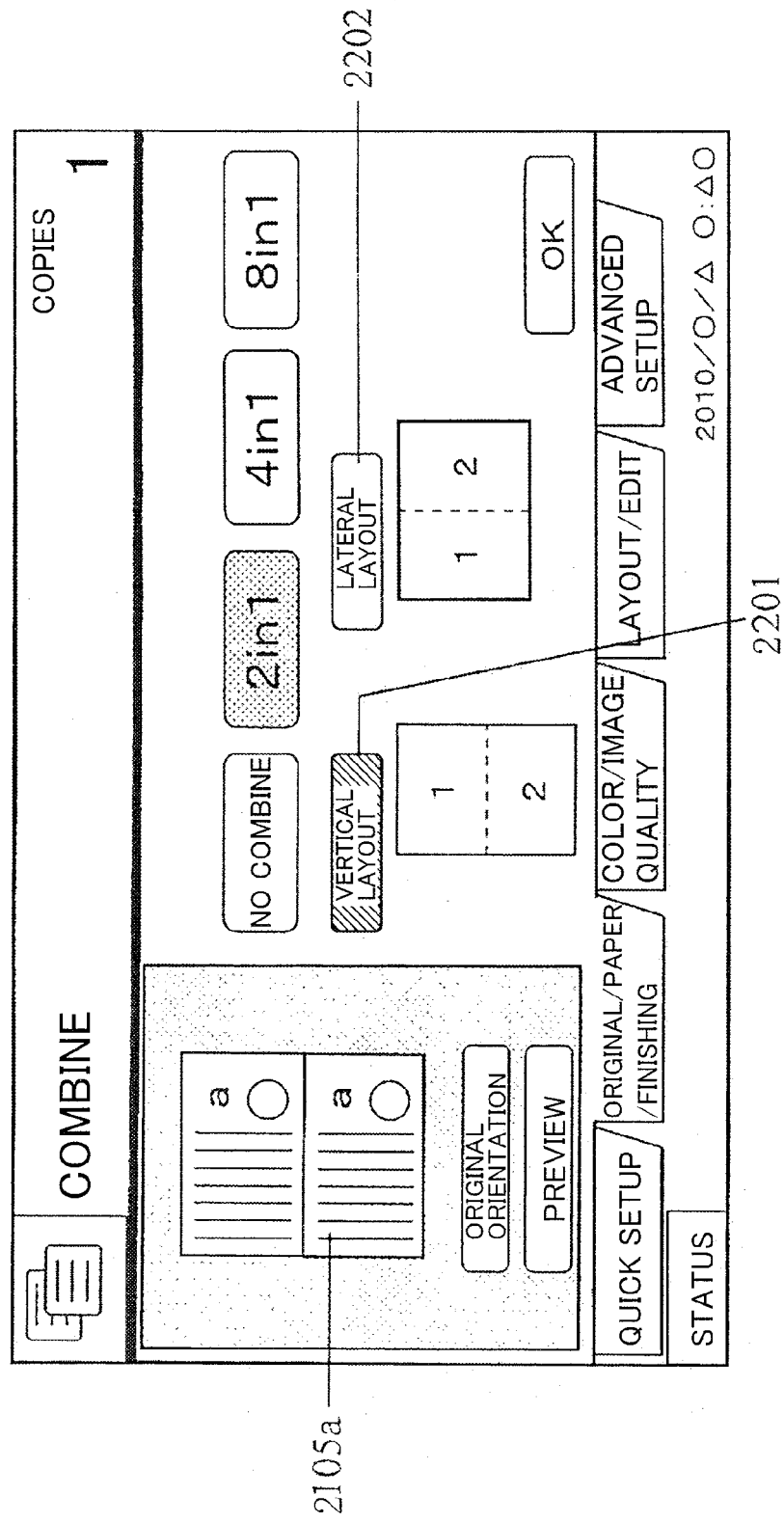

OPERATION DEVICE, IMAGE FORMING APPARATUS, AND OPERATION METHOD STORING ORIENTATION SETTING INFORMATION

This application is based on and claims the benefit of priority from Japanese Patent Application Nos. 2010-241351 and 2010-263556, respectively filed on 27 Oct. 2010 and 26 Nov. 2010, the contents of which are incorporated herein by reference.

BACKGROUND OF THE INVENTION

1. Field of the Invention

The present invention relates to an operation device, an image forming apparatus, and operation method.

2. Background Art

An image forming apparatus having a copy function has become multifunctional in order to respond to users' various needs. As the image forming apparatus becomes multifunctional, the number of setting item keys (selection item keys) for realizing various functions increases.

On the other hand, a space for a display screen is limited on the operation panel. Therefore, in order to efficiently use the limited space for the display screen, only the setting item keys for representative functions are listed thereon as indexes, and the setting item keys for other functions are provided in a plurality of lower layers of the setting item key for each of the representative functions.

However, if a user is not used to using the image forming apparatus provided with such a display screen of the operation panel, it is difficult for the user to appropriately place an original on a platen and select a predetermined setting item key by going through the plurality of levels during panel operation. Therefore, the user may fail to appropriately obtain a printed matter (copy) in a desired mode.

Here, as Japanese Unexamined Patent Application Publication No. 2008-299228, an image forming apparatus having a copy function that is configured to include a display unit for displaying various information is disclosed. The image forming apparatus displays, on the display unit, a guidance window relating to operation of the copy function along with a selection operation screen for prompting a user's selection operation. In addition, the image forming apparatus is configured to include a display control unit that controls to display a copy image reflecting a result of the user's selection operation on the display unit, upon acceptance of intention of terminating the selection operation by the user via an operation unit or the like.

In such a configuration, if a user performs the selection operation such as selection of a key for obtaining a desired output from the selection operation screen according to guidance by the guidance window for copy function, and then inputs intention of terminating the selection operation, the image forming apparatus displays a copy image according to the result of the selection operation as a preview.

Accordingly, the image forming apparatus can allow a user to visually confirm whether a desired output can be obtained or not, before actually performing a copy process.

As a result, Japanese Unexamined Patent Application Publication No. 2008-299228 claims that the image forming apparatus can provide a user friendly guidance function and dramatically improve convenience.

In addition, as Japanese Unexamined Patent Application Publication No. 2003-037696, an image input-output processing apparatus including a network function, a scanner function and a FAX function is disclosed. The image input-output processing apparatus is configured to include a processing speed determination unit that determines whether a placing orientation of an original is appropriate or not by determining printing processing rate from a placing orientation of the original and printing process conditions, and an operation display unit that notifies inappropriate placing orientation of the original and prompts a user to fix the placing orientation.

In such a configuration, Japanese Unexamined Patent Application Publication No. 2003-037696 claims that the image input-output processing apparatus can reduce printing processing time by determining an appropriate original placing orientation based on user setting information, original size, and placing orientation and prompting a user to fix the orientation before performing printing.

However, Japanese Unexamined Patent Application Publication No. 2008-299228 and Japanese Unexamined Patent Application Publication No. 2003-037696 do not disclose a technology about a preview image function that displays a preview image of an original on the operation panel (touch screen). Therefore, even by applying the technologies disclosed in Japanese Unexamined Patent Application Publication No. 2008-299228 or Japanese Unexamined Patent Application Publication No. 2003-037696 to the preview image function, it is not clear if convenience for user can be improved or not, and it is also not clear if printing processing time can be reduced or not.

SUMMARY OF THE INVENTION

Given this, an objective of the present invention is to provide an operation device, an image forming apparatus and an operation method that allow easy checking of a display orientation of a preview image, thereby improving operability by a user.

Another objective of the present invention is to provide an operation device, an image forming apparatus and an operation method that allow change of the display orientation of the preview image by a user's selection in a case in which the display orientation of the preview image of an original is not the same as the placing orientation of the original on a platen, thereby improving operability by a user.

The present invention relates to an operation device including:

a touch screen that can display a setting item window displaying predetermined setting item keys and a preview image window displaying a preview image corresponding to original image data in a preset display orientation and selectably displays the setting item keys;

an orientation setting information storage unit that stores orientation setting information regarding the display orientation of the preview image;

an orientation setting information acquisition unit that acquires the orientation setting information from the orientation setting information storage unit when the preview image is displayed on the preview image window in the predetermined display orientation;

a tab display acceptance unit that selectably displays a tab key on the preview image window, the tab key including the orientation setting information acquired from the orientation setting information acquisition unit; and a display adjustment unit that displays the tab key seamlessly with the preview image on the touch screen, the tab key including the orientation setting information corresponding to the display orientation of the preview image displayed on the preview image window.

The present invention relates to an image forming apparatus including:

an image reading device including a platen including a reading reference point, on which an original is placed such that a target surface faces the platen, the image reading device reading an image on the target surface and generating image data and an operation device including:

a touch screen that can display a setting item window displaying predetermined setting item keys and a preview image window displaying a preview image corresponding to original image data in a preset display orientation and selectably displays the setting item keys an orientation setting information storage unit that stores orientation setting information regarding the display orientation of the preview image;

an orientation setting information acquisition unit that acquires the orientation setting information from the orientation setting information storage unit when the preview image is displayed on the preview image window in the predetermined display orientation;

a tab display acceptance unit that selectably displays a tab key on the preview image window, the tab key including the orientation setting information acquired from the orientation setting information acquisition unit; and a display adjustment unit that displays the tab key seamlessly with the preview image on the touch screen, the tab key including the orientation setting information corresponding to the display orientation of the preview image displayed on the preview image window.

The present invention also relates to an operation method of an operation device including:

a touch screen that can display a setting item window displaying predetermined setting item keys and a preview image window displaying a preview image corresponding to original image data in a preset display orientation and selectably displays the setting item keys; and an orientation setting information storage unit that stores orientation setting information regarding the display orientation of the preview image, including:

an orientation setting information acquisition step in which the operation device acquires the orientation setting information from the orientation setting information storage unit when the preview image is displayed on the preview image window in the predetermined display orientation;

a tab display acceptance step in which the operation device selectably displays a tab key on the preview image window, the tab key including the orientation setting information acquired from the orientation setting information acquisition unit; and a display adjustment step in which the operation device displays the tab key seamlessly with the preview image on the touch screen, the tab key including the orientation setting information corresponding to the display orientation of the preview image displayed on the preview image window.

The present invention also relates to an operation device that acquires image data from an image reading device including a platen on which an original is placed in a predetermined placing orientation such that a target surface faces the platen, the image reading device reading an image on the target surface and generating image data, the operation device including:

a touch screen that displays, in a preset display orientation, a preview image acquired from image data of the original being placed in a predetermined placing orientation;

an orientation determination unit that determines, upon display of the preview image on the touch screen, whether the display orientation of the preview image is the same as the placing orientation of the original;

a change acceptance unit that selectably displays, on the touch screen, an orientation change key for changing the display orientation of the preview image in a case in which the orientation determination unit determines that the display orientation of the preview image is not the same as the placing orientation of the original;

a setting acceptance unit that selectably displays, on the touch screen, at least one orientation setting key for setting the display orientation of the preview image when the orientation change key is selected; and a display orientation changing unit that, when a predetermined orientation setting key is selected, changes the display orientation of the preview image to the display orientation defined by the orientation setting key.

The present invention also relates to an image forming apparatus including:

an image reading device including a platen on which an original is placed such that a target surface including a reading reference point faces the platen, the image reading device reading an image on the target surface and generating image data and an operation device including:

a touch screen that displays, in a preset display orientation, a preview image acquired from image data of the original being placed in a predetermined placing orientation;

an orientation determination unit that determines, upon display of the preview image on the touch screen, whether the display orientation of the preview image is the same as the placing orientation of the original;

a change acceptance unit that selectably displays, on the touch screen, an orientation change key for changing the display orientation of the preview image in a case in which the orientation determination unit determines that the display orientation of the preview image is not the same as the placing orientation of the original;

a setting acceptance unit that selectably displays, on the touch screen, at least one orientation setting key for setting the display orientation of the preview image when the orientation change key is selected; and a display orientation changing unit that, when a predetermined orientation setting key is selected, changes the display orientation of the preview image to the display orientation defined by the orientation setting key.

The present invention relates to an operation method of an operation device that acquires image data from an image reading device including a platen on which an original is placed in a predetermined placing orientation such that a target surface faces the platen, the image reading device reading an image on the target surface and generating image data, and includes a touch screen that displays, in a preset display orientation, a preview image acquired from image data of the original being placed in a predetermined placing orientation, the operation method including:

an orientation determination step in which the operation device determines, upon display of the preview image on the touch screen, whether the display orientation of the preview image is the same as the placing orientation of the original;

a change acceptance step in which the operation device selectably displays, on the touch screen, an orientation change key for changing the display orientation of the preview image in a case in which the display orientation of the preview image is determined not to be the same as the placing orientation of the original in the orientation determination step;

a setting acceptance step in which the operation device selectably displays, on the touch screen, a predetermined number of orientation setting keys for setting the display orientation of the preview image when the orientation change key is selected; and a display orientation changing step in which the operation device, when a predetermined orientation setting key is selected, changes the display orientation of the preview image to the display orientation defined by the orientation setting key.

BRIEF DESCRIPTION OF THE DRAWINGS

FIG. 7A is a diagram illustrating an example of a copy function window displayed on a touch screen according to the first embodiment;

FIG. 7B is a diagram illustrating an example of a relationship between an orientation of original image data and a main scanning direction and a sub scanning direction according to the first embodiment;

FIG. 8Bb is a diagram illustrating another example of a display orientation of a preview image according to the first embodiment;

FIG. 11A is a diagram illustrating an example of a case according to the first embodiment, in which a preview image of a vertically long original with text written laterally is displayed in portrait orientation;

FIG. 11B is a diagram illustrating an example of a window displaying a setting item keys for combine according to the first embodiment;

FIG. 19A is a diagram illustrating an example of a case according to the second embodiment, in which a vertically long original with text written laterally is placed in landscape orientation;

FIG. 21A is a diagram illustrating an example of a predetermined number of orientation setting keys being displayed, according to the second embodiment;

FIG. 22A is a diagram illustrating an example of a window displaying the setting item key for combine according to the second embodiment.

DETAILED DESCRIPTION OF THE INVENTION

In recent years, an operation unit of an image forming apparatus is configured to have the abovementioned preview image function. In the abovementioned preview image function, the operation unit displays a preview image corresponding to original image data in a display orientation that is set in advance by a particular user such as a manufacturer.

Here, orientation of the preview image may not be the same (appropriate) as a text direction (vertical or lateral) of the preview image. In addition, display orientation of the preview image may not be the same as a placing orientation of the original.

In this case, when a user who is not used to the preview image function looks at the preview image, the user cannot determine whether placement of an original is wrong or the preview image is wrong, leading to misunderstanding and confusion of the user.

Especially in a case in which a user performs a function requiring condition setting while looking at the preview image, for example a combine function for combining images from two or more originals, if the display orientation of the preview image is not appropriate to the text direction of the preview image, it is difficult for the user to input setting conditions for the combine function and the user may input wrong setting conditions.

In addition, in a case in which the user performs a function requiring condition setting while looking at the preview image, for example a combine function for combining images from two or more originals, if the display orientation of the preview image is not the same as the placing orientation of the original, even if the user performs condition setting based on the preview image, an image finally formed corresponds to the placing operation of the original and the condition setting may become inappropriate.

As a result, a secondary problem such as miscopy may be caused.

For example, there may be a case in which A4- or B5-sized original can be placed only in one orientation (for example, only in landscape orientation) and display orientation of the preview image is limited. In such a case, a user may be forced to input setting conditions relating to the combine function while looking at the preview image, without being able to change the display orientation of the preview image, leading to a wrong input.

An embodiment of an image forming apparatus provided with the operation device of the present invention is described hereinafter with reference to the accompanying drawings for better understanding of the present invention. It should be noted that the following embodiments are mere examples of implementation of the present invention, and in no way restrict the technical scope of the present invention. As used herein, an alphabetical letter "S" prefixed to a number in the flowcharts represents a step.

First Embodiment

The image forming apparatus provided with the operation device according to the present invention is described hereinafter.

Figure 1:
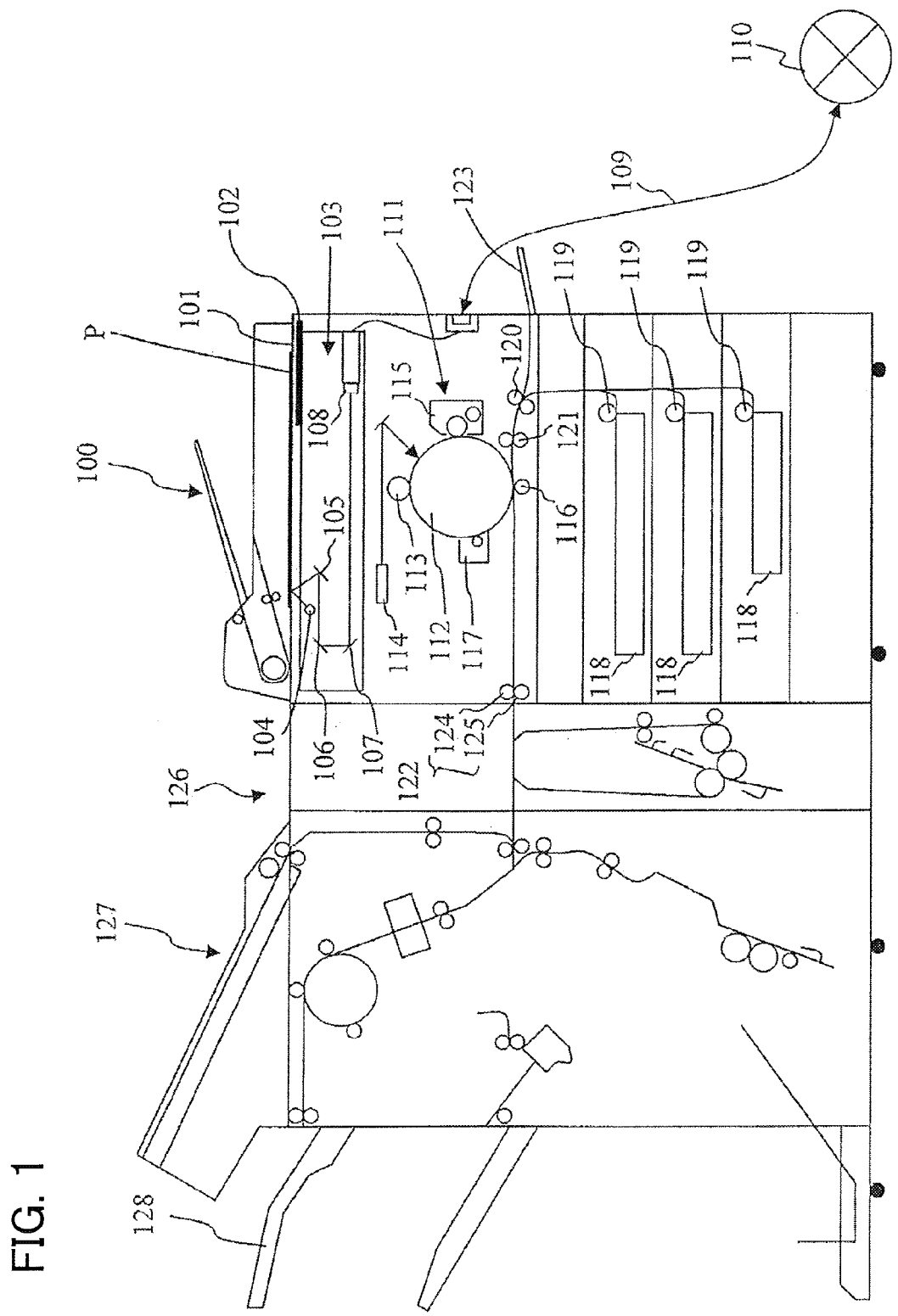
FIG. 1 is a schematic view illustrating an entire internal configuration of a multifunction peripheral according to a first embodiment.

FIG. 1 is a schematic view illustrating an entire internal configuration of a multifunction peripheral according to a first embodiment. FIG. 1 is a schematic view of an image forming apparatus in which a folding device and a binding device are connected to each other. However, the details of each component not directly related to the present embodiment are omitted. The image forming apparatus according to the present embodiment is a multifunction peripheral or the like that includes for example, a printer or a scanner unit, or a printer, a copying machine, a scanner, a FAX, or the like, which functions as an image forming apparatus including a copy service, a scanner service, a facsimile service, a printer service and the like. As an example, operation of a multifunction peripheral (MFP) 100 in a case of using a copy service is briefly described hereinafter.

In a case of using the multifunction peripheral 100, first, a user places an original P on a platen 101 disposed on an upper face of the multifunction peripheral 100 such that a target surface faces a surface of a platen 101, and inputs setting for the copy service via the operation unit 102. In the operation unit 102 (touch screen 201), a copy function window (initial window) related to the copy service provided by the multifunction peripheral 100 is displayed. In the copy function window, a plurality of function item (setting item) keys (for example, Combine key, Punch/Staple key and the like) is selectably displayed.

The user selects and inputs setting conditions by selecting the function item (setting item) keys displayed on the operation unit 102 (touch screen 201), thereby inputting setting conditions (output conditions) regarding the copy service.

In addition, in the copy function window, a preview key for displaying an image of the original placed on the platen 101 on the touch screen 201 of the operation unit 102 is selectably displayed.

When the user selects the preview key, the multifunction peripheral 100 operates an image reading unit 103 (described later; also referred to as prescanning) and displays a preview image, which is a reduced-size image of image data thus read, on a predetermined preview image window by the touch screen 201.

Thereafter, the user selects various function item (setting item) keys while looking at the preview image displayed on the touch screen 201 and inputs desired setting conditions.

After selection and input of the setting conditions, the user presses a start key provided in the operation unit 102 to start the copy service of the multifunction peripheral 100.

When the multifunction peripheral 100 starts processing the copy service, the image reading unit 103 (image reading device) reads an image on the target surface of the original and generates image data.

More specifically, the image reading unit 103 (image reading device) emits light from a light source 104 and irradiates the original placed on the platen 101 with the light.

Thereafter, the light reflected by the original is guided by the mirrors 105, 106, 107 to an imaging device 108.

The imaging device 108 performs photoelectric conversion of the light thus guided, and outputs as an electric signal.

And then, a processing circuit (not illustrated) performs correction processing, image quality processing, compression processing and the like and generates image data corresponding to an image formed on a surface of the original.

Alternatively, the multifunction peripheral 100 can also receive image data submitted with an instruction of output (image formation) from a network 110, via a communication cable 109 connected to the multifunction peripheral 100. In such a case, processing of the image reading unit 103 is omitted.

In addition, the image data can also be: image data obtained by prescanning; image data combining a plurality of pieces of image data; and image data with additional information (letters, page number and the like), depending on the setting conditions input by the user.

The image forming unit 111 forms a toner image from the abovementioned data and transfers the toner image to a sheet. The image forming unit 111 includes a photoreceptor drum 112. The photoreceptor drum 112 rotates in a predetermined direction at a constant speed.

In the periphery of the photoreceptor drum 112, a charging device 113, an exposure unit 114, a developing device 115, a transfer device 116, a cleaning unit 117 and the like are disposed, in this order from an upstream side in a rotational direction.

The charging device 113 uniformly charges a surface of the photoreceptor drum 112.

The exposure unit 114 irradiates a surface of the photoreceptor drum 112 thus charged with laser based on the image data, thereby forming an electrostatic latent image.

The developing device 115 deposits toner on the electrostatic latent image being fed, thereby forming a toner image on the surface of the photoreceptor drum 116.

The transfer device 116 transfers the toner image formed on the photoreceptor drum 112 to a image forming medium (for example, a sheet).

The cleaning unit 117 removes excessive toner remaining on the surface of the photoreceptor drum 112. This series of processes is performed by rotation of the photoreceptor drum 112.

The sheet is fed from a plurality of paper feeding cassettes 118 provided in the multifunction peripheral 100.

The sheet to be fed is pulled out from any one of the paper feeding cassettes 118 to a paper path by a pickup roller 119. In each of the paper feeding cassettes 118, sheets of different types are stored. The sheets are fed based on setting regarding the output conditions.

The sheet being pulled out to the paper path is fed into between the photoreceptor drum 112 and the transfer device 116 by a feeding roller 120 and a resist roller 121.

The sheet thus fed is, after transfer of the toner image thereto by the transfer device 116, further fed to the fusing device 122. The sheet fed by the feeding roller 120 may also be fed from a manual feeding tray 123 provided in the multifunction peripheral 100.

When the sheet to which the toner image is transferred passes between a heating roller 124 and a pressurizing roller 125 provided in the fusing device 122, heat and pressure are applied to the toner image, thereby fusing the toner image (visible image) onto the sheet. Heat quantity of the heating roller 124 is optimized according to types of sheets, in order to appropriately realizing the fusing.

The image formation is completed with fusing of the toner image (visible image) onto the sheet.

The sheet onto which the toner image (visible image) is fused is fed to the folding device 126 via the fusing device 122.

The sheet thus fed is subjected to a folding process in the folding device 126, according to the setting conditions input by the user. In a case in which the folding process instruction is not input, the sheet simply passes through the folding device 126. In addition, in a case in which post-processing (for example, stapling, punching, binding and the like) instruction is input by the user as the setting conditions, the sheet having passed through the folding device 126 is fed to the binding device 127 for post-processing and stored in an ejected paper tray 128.

The folding device 126 and the binding device 127 are detachable from the multifunctional peripheral 100.

In a case in which the folding device 126 and the binding device 127 are detached, the sheet onto which the visible image is fused is stored as a printer matter in the ejected paper tray 128 provided on a side face of the multifunctional peripheral 100.

By the above described steps, the multifunction peripheral 100 provides the copy service to a user. Other services are provided by operation of the image reading unit 103, the image forming unit 111 and the like. The multifunction peripheral 100 of the present embodiment may also provide: a print service of forming an image by image data submitted from the network 110; a scan service of scanning an image of an original; a facsimile communication service of sending and receiving image data from and to the network 110; and a memory service of storing image data being read.

Figure 2:
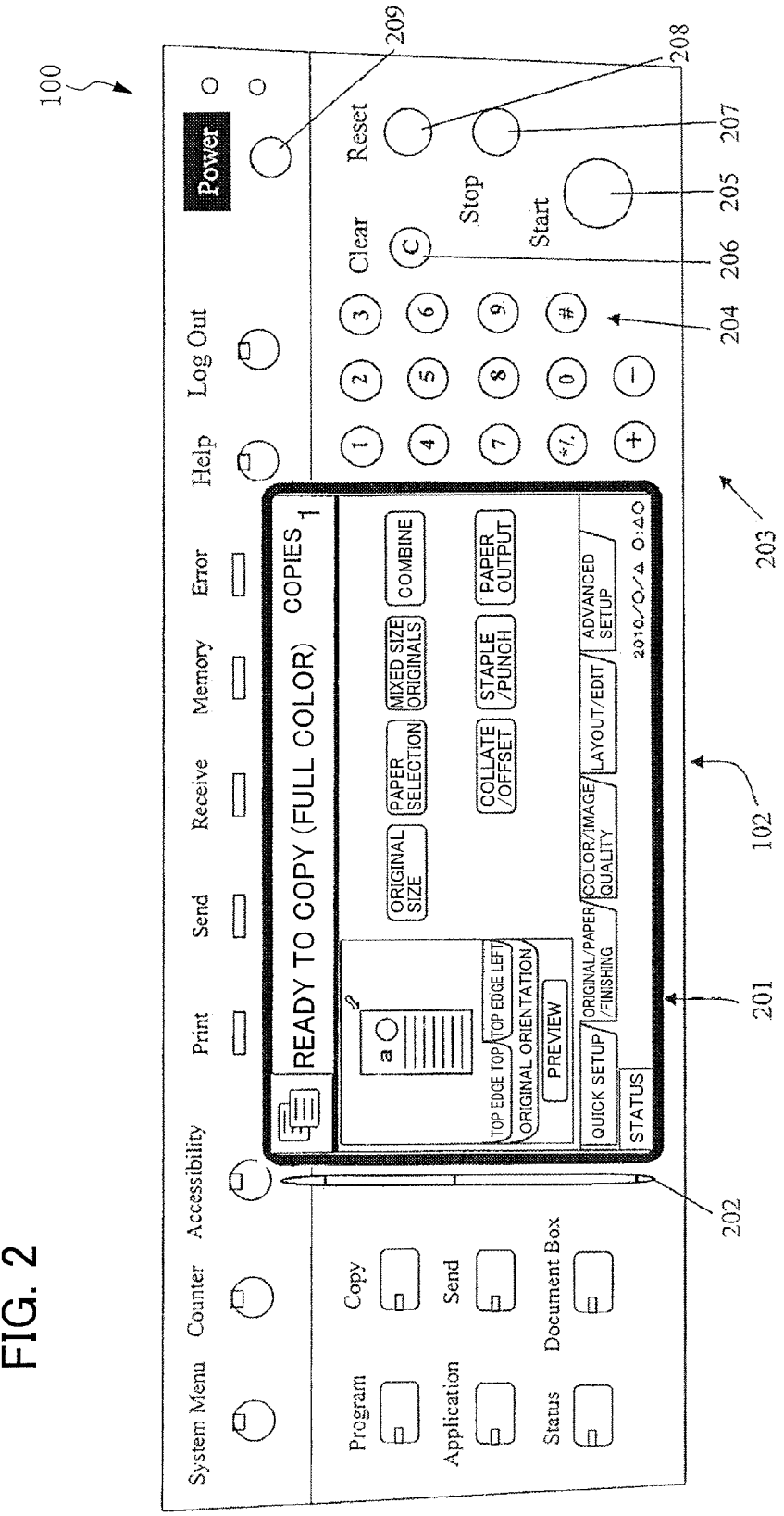
FIG. 2 is a schematic view illustrating the overall configuration of an operation unit according to the first embodiment.

FIG. 2 is a schematic view illustrating the overall configuration of an operation unit according to the first embodiment. A user inputs setting conditions or the like and confirms the setting conditions being input in relation to image formation as described above by use of the operation unit 102. When the setting conditions are input, the touch screen 201 (operation panel) provided in the operation unit 102, a stylus pen 202, and the operation key 203 are used.

The touch screen 201 includes a display unit 201a that can display a plurality of function item (setting item) keys and a touch sensor 201b that is disposed to be layered on a display surface of the display unit 201a.

In the present embodiment, the touch sensor 201b is analog resistive film type.

The touch sensor 201b is configured by lamination of a transparent upper film and a lower glass base plate via a spacer.

On facing surfaces of the upper film and the lower glass base plate, a transparent electrode layer composed of ITO (Indium Tin Oxide) and the like is provided.

The touch sensor 201b is composed such that, upon pressing of the upper film by a user, the transparent electrode layer on the upper film side and the transparent electrode layer on the lower glass base plate side contact each other at a position corresponding to a pressed position (user-indicated position, contacted position, contacted area).

The touch sensor 201b applies a voltage to the upper film or the lower glass base plate, and extracts a voltage value corresponding to the depression position from the lower glass base plate or the upper film to thereby detect a coordinate position (depression position) corresponding to the voltage value.

If the depression position thus detected is included in a display region of the function item (setting item) key in the function window displayed on the touch screen, the operation unit 102 accepts input (setting) of the function item (setting item).

Furthermore, a display unit 201a such as an LCD (liquid crystal display) or the like is provided below the lower glass base plate.

A specific window is displayed on the touch screen 201 as the display unit 201a displays a window such as an initial window, a copy function window or the like.

The touch screen 201 has a function for inputting the setting conditions and the like, and a function for displaying the setting conditions and the like thus input.

Furthermore, a stylus pen 202 is provided in the vicinity of the touch screen 201.

When a user brings the tip of the stylus pen 202 into contact with the touch screen 201 (touch sensor 201b), the touch sensor 201 detects the coordinate value corresponding to the contact position (depression position).

If a function item (setting item) key or the like corresponds to (overlaps) the coordinate value thus detected, function item (setting item) key or the like is selected.

In other words, the user can select by depressing the function item (setting item) key or the like being displayed with the stylus pen 202.

Furthermore, a predetermined number of operation keys 203 are provided in the vicinity of the touch screen 201.

The operation keys 203 include, for example, number keys 204, a start key 205, a clear key 206, a stop key 207, a reset key 208, and a power key 209.

Next, a hardware configuration of a control system of the multifunction peripheral 100 and the operation unit 102 is described with reference to FIG. 3.

Figure 3:
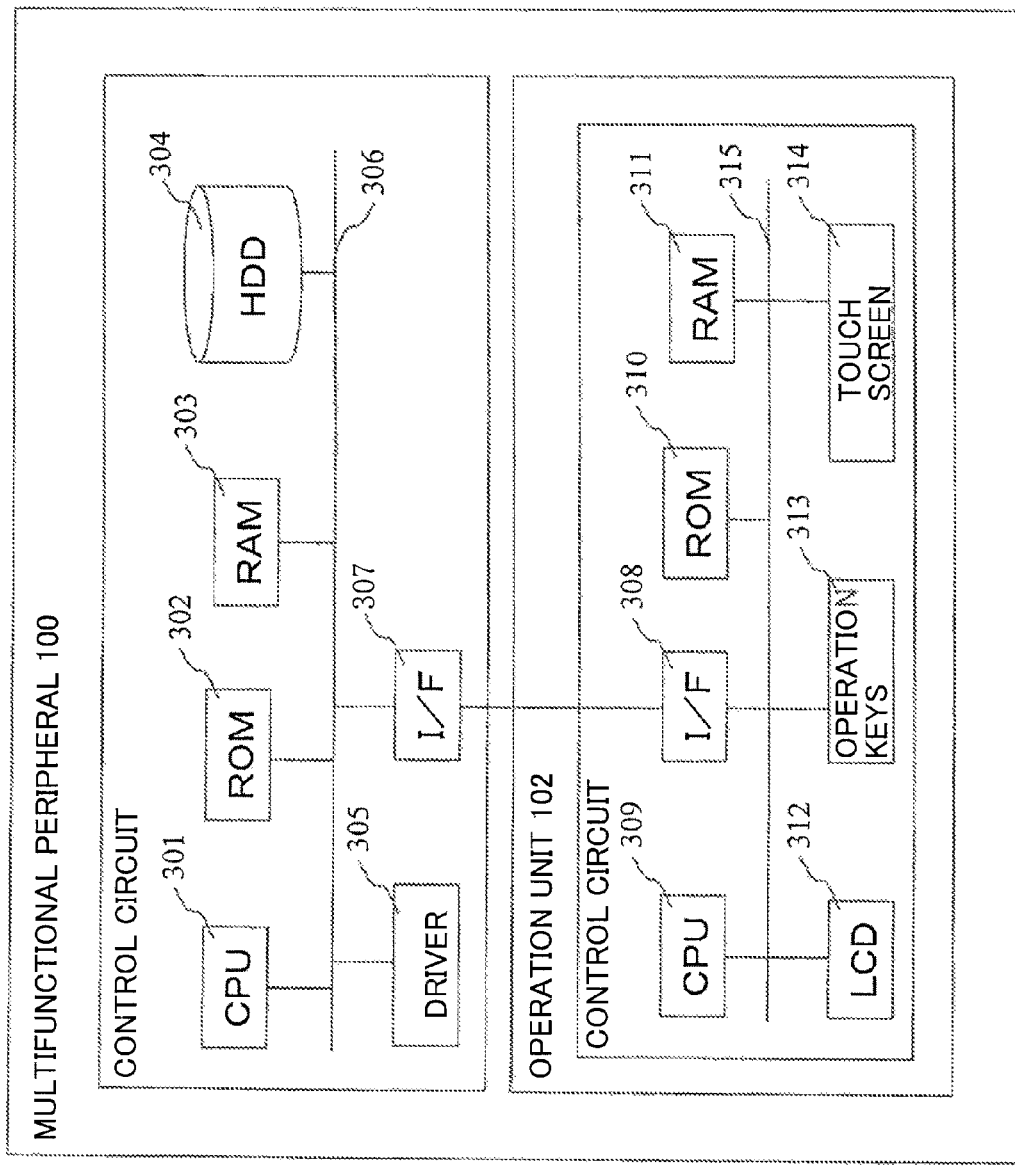
FIG. 3 is a diagram illustrating a hardware configuration of a control system of the multifunction peripheral and the operation unit according to the first embodiment.

FIG. 3 is a diagram illustrating a hardware configuration of a control system of the multifunction peripheral 100 and the operation unit 102 according to the present embodiment. However, the details of each component not directly related to the present embodiment are omitted.

A control circuit of the multifunction peripheral 100 is configured such that a CPU (Central Processing Unit) 301, ROM (Read Only Memory) 302, RAM (Random Access Memory) 303, a HDD (Hard Disk Drive) 304, and drivers 305 respectively corresponding to the driving units are connected via an internal bus 306. The CPU 301 for example uses the RAM 303 as a work area, and controls the operation of each drive unit illustrated in FIG. 1 by execution of programs that are stored in the ROM 302, the HDD 304, or the like, and by exchange of data or instructions from the operation unit 102 or the driver 305 based on the results of execution of the programs. Each unit (illustrated in FIG. 4) described hereafter other than the drive units above is operated by execution of programs by the CPU 301.

An internal interface I/F 307 is connected to the internal bus 306 of the control circuit, and the internal interface I/F 307 connects the control circuit of the multifunction peripheral 100 with the control circuit of the operation unit 102 or the like. The CPU 301 receives an instruction signal from the control circuit of the operation unit 102 and the like and transmit an instruction signal, data and the like to the control unit of the operation unit 102 and the like, via the internal interface I/F 307.

Furthermore, the control circuit of the operation unit 102 is configured from a CPU 309, a ROM 310, a RAM 311, a LCD 312, an operation key 313 (203), a touch panel 314 (201), and an internal interface I/F 308 connected by an internal bus 315.

When a user operates the operation keys 313 and the touch screen 314, the CPU 309 transmits an instruction signal based on the operation to the control circuit of the multifunction peripheral 100 via the internal interface I/F 308. The function of the CPU 309, the ROM 310, and the RAM 311 is the same as the above, and each unit described below (illustrated in FIG. 4) is realized by execution of programs by the CPU 309. The programs or data for realization of each unit described below are stored in the ROM 310.

Figure 4:
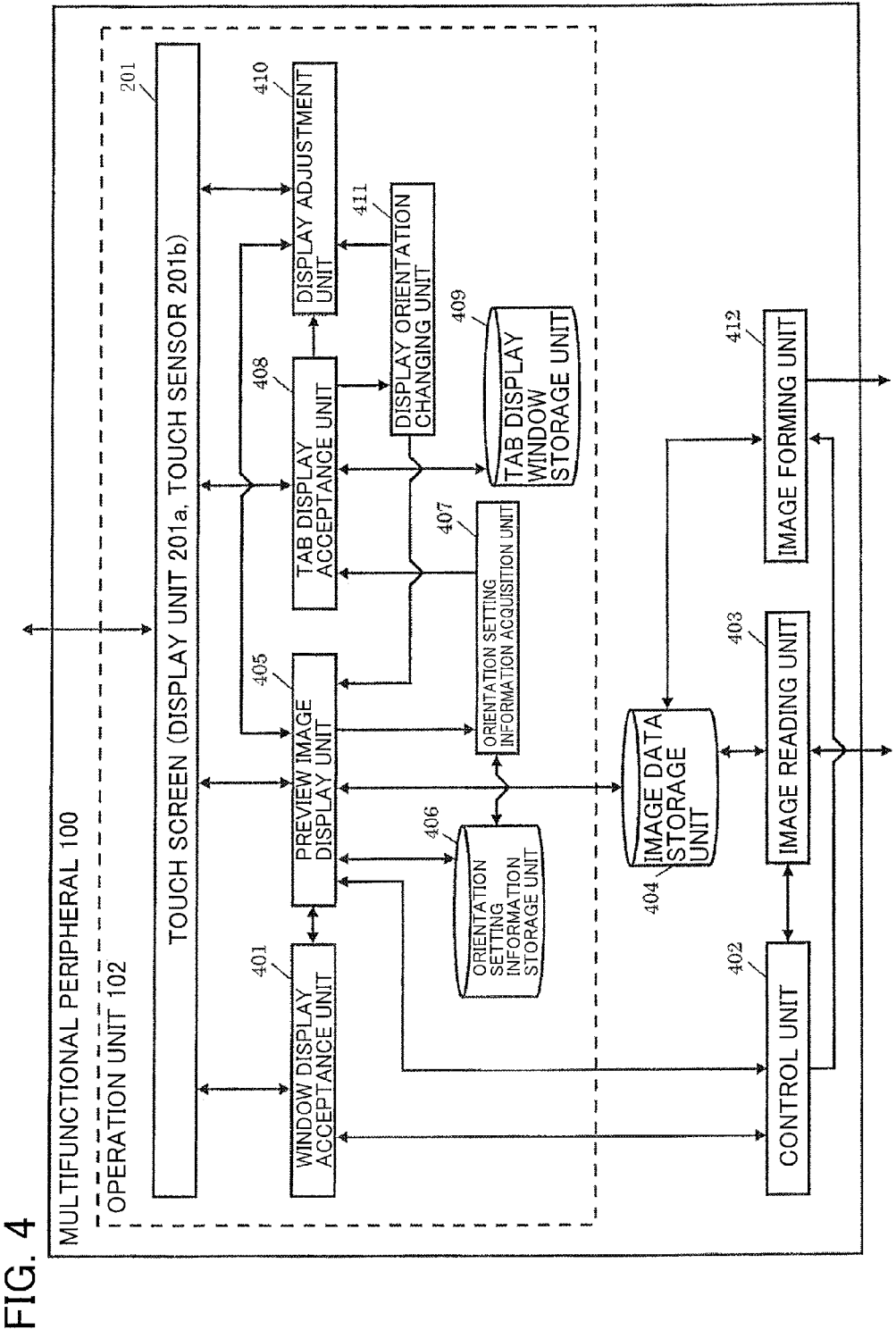
FIG. 4 is a functional block diagram of the multifunction peripheral and the operation unit according to the first embodiment.
Figure 5:
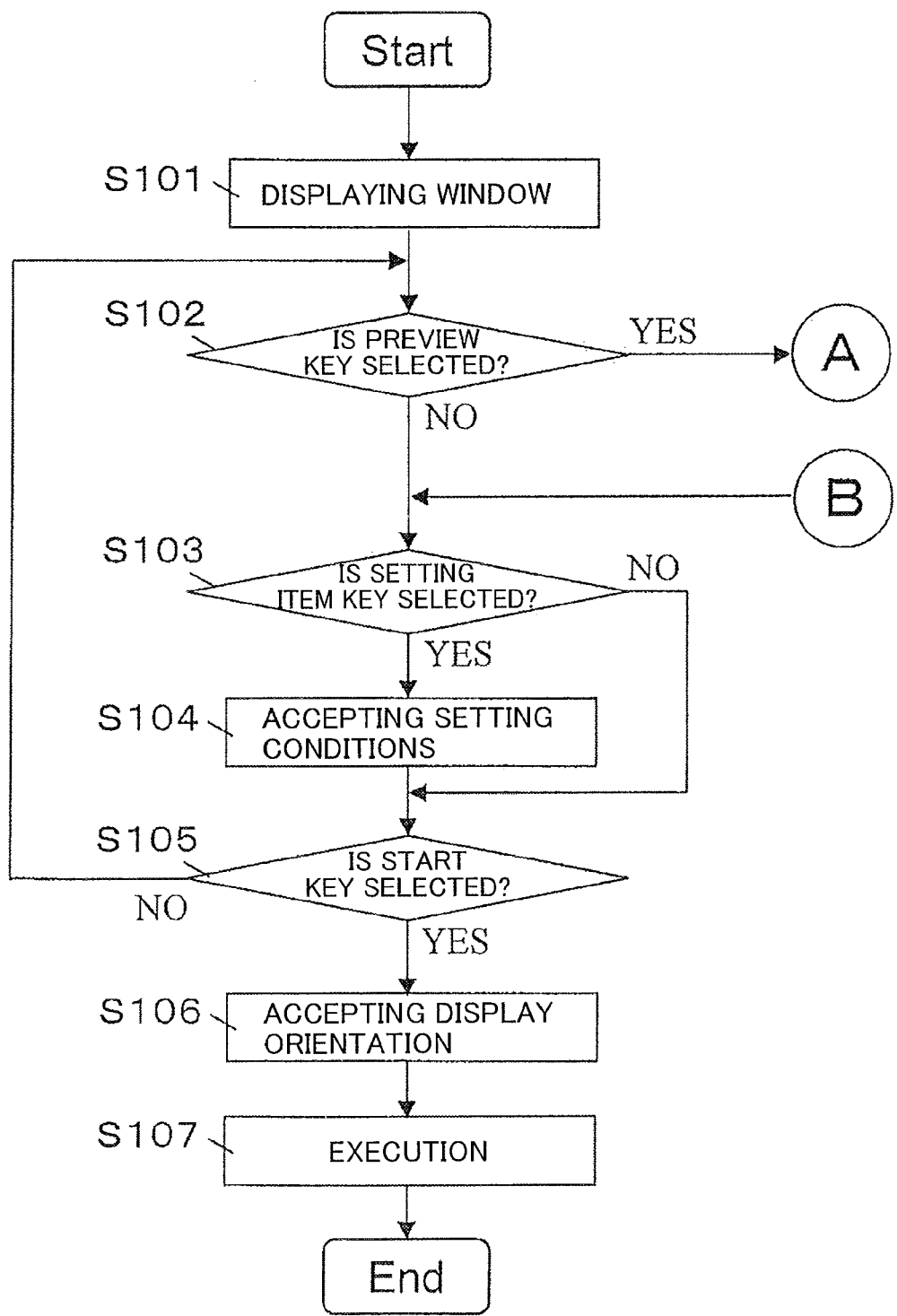
FIG. 5 is a first flowchart showing an execution procedure of the first embodiment.
Figure 6:
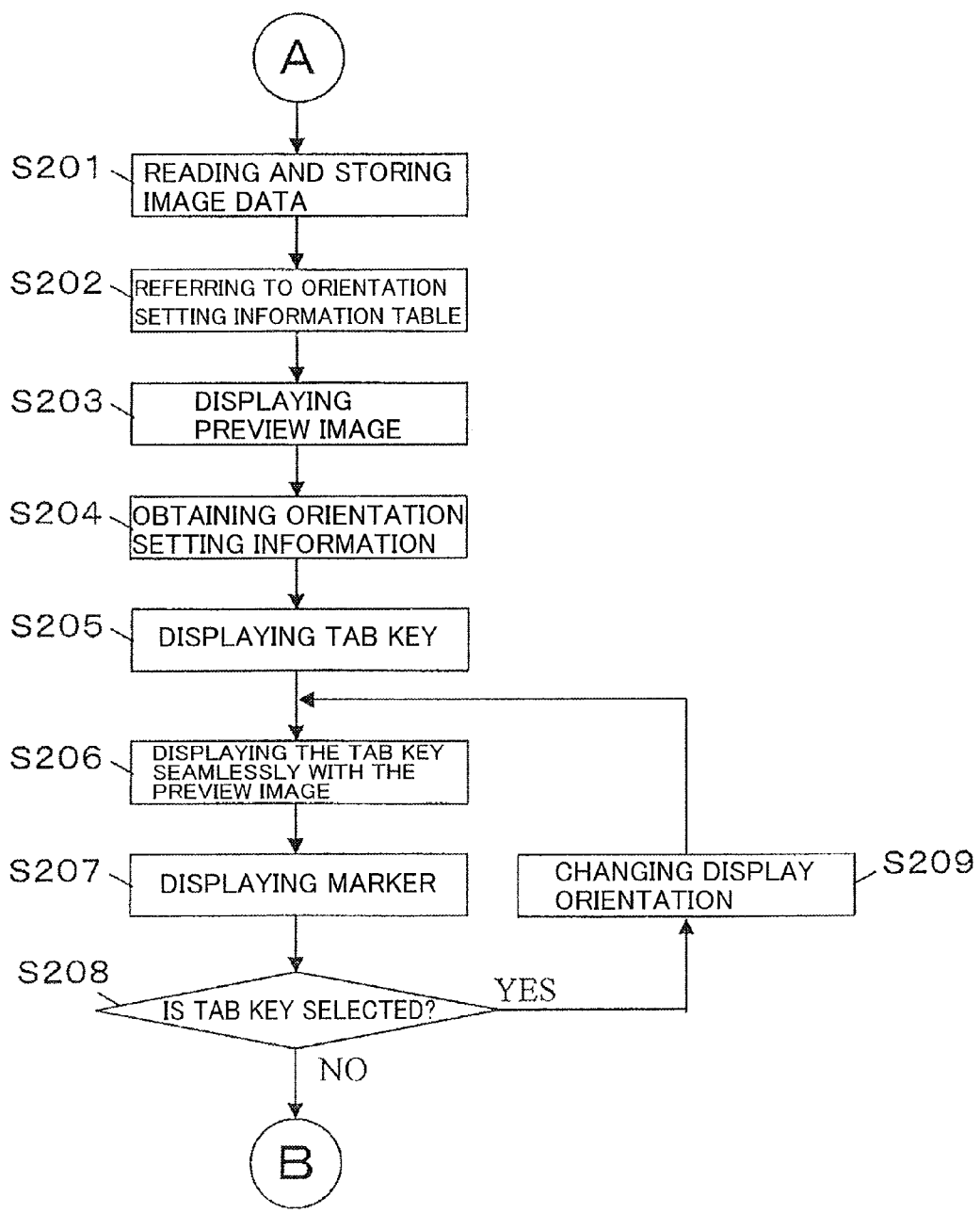
FIG. 6 is a second flowchart showing an execution procedure of the first embodiment.

Next, a configuration and execution procedure according to the first embodiment of the present invention will be described with reference to FIGS. 4 to 6. FIG. 4 is a functional block diagram of the multifunction peripheral and the operation unit according to the first embodiment. FIG. 5 is a first flowchart showing an execution procedure of the first embodiment. FIG. 6 is a second flowchart showing an execution procedure of the first embodiment.

First, when a user turns on the multifunction peripheral 100, the operation unit 102 is activated upon activation of the multifunction peripheral 100. And then, a window display acceptance unit 401 of the operation unit 102 displays a preset initial window (for example, a copy function window) on the touch screen 201 (FIG. 5; S101).

FIG. 7A is a diagram illustrating an example of the copy function window displayed on the touch screen according to the first embodiment.

As shown in FIG. 7A, a setting item key 701 for condition setting of the copy service (for example, a combine key 701a, punch/staple key 701b and the like); a preview key 702 for displaying image based on image data of an original placed on the platen 101 as a preview image; and a preview image window 703 displaying the preview image are displayed in the copy function window 700.

Here, the user places the original on the platen 101 in a predetermined placing orientation. The placing orientation of the original is either portrait (the original is placed vertically on the platen 101) or landscape (laterally on the platen 101).

And then, when the user selects (presses) the preview key 702 on the copy function window 700 (FIG. 5; S102YES), the window display acceptance unit 401 accepts the selection of the preview key 702 and notifies the control unit 402 of the multifunction peripheral 100 of the selection.

In response to the notification, the control unit 402 instructs the image reading unit 403 to read an image of the original as image data.

In response to the instruction, the image reading unit 403 reads the image of the original on the platen 101, generates the image data, and stores the image data to an image data storage unit 404 (FIG. 6; S201). A case in which the user does not select the preview key 702 (FIG. 5; S102NO) is described later.

FIG. 7B is a diagram illustrating an example of a relationship between an orientation of original image data and a main scanning direction and a sub scanning direction according to the first embodiment.

Here, as shown in FIG. 7B, it is defined in advance: an upper left corner of the platen 705 as an origin 706 (reference point 0); a right direction from the origin 706 as a sub-scanning direction; and a down direction therefrom as a main scanning direction.

The origin 706 corresponds to a position of alignment of original on the platen 705. When the user places the original 707 on the platen 705, a corner of the original 707 is aligned to the position of alignment (in other words, the origin 706 on an upper left corner of the platen 705).

The image data 704 of the original 707 that is read according to the setting is image data of an adverse side (target surface) of the original placed on the platen 101 reverse side up. Therefore, the image data is stored in such a way that the origin is an upper right corner 708; a left direction from the upper right corner 708 is an X axis direction (sub-scanning direction); and a down direction therefrom is a Y axis direction (main scanning direction).

After storing the image data to the image data storage unit 404, the image reading unit 403 notifies the preview image display unit 405 of the storage via the control unit 402.

In response to the notification, the preview image display unit 405 acquires the image data from the image data storage unit 404, generates a preview image corresponding to the image data, and refers to an orientation setting information table that is stored in advance in an orientation setting information storage unit 406 (FIG. 6; S202).

Figure 8A:
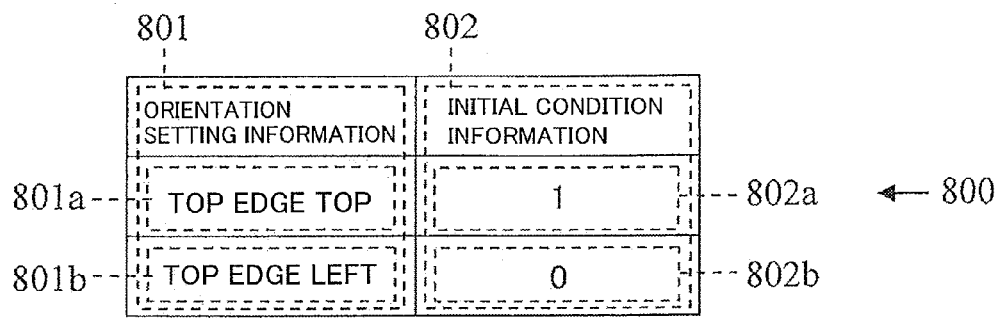
FIG. 8A is a diagram illustrating an example of an orientation setting information table according to the first embodiment.

FIG. 8A is a diagram illustrating an example of the orientation setting information table according to the first embodiment.

As shown in FIG. 8A, the orientation setting information table 800 stores orientation setting information 801 (for example, "Top Edge Top" 801a, "Top Edge Left" 801b) and initial condition information 802 indicating whether the orientation setting information 801 is preset as an initial condition (for example, "1" 802a indicating presetting as an initial condition, "0" 802b indicating no presetting as an initial condition), in association with each other.

The preview image display unit 405 acquires, from the orientation setting information table 800, the orientation setting information 801 (for example, "Top Edge Top" 801a) corresponding to "1" 802a indicating presetting.

Figure 8B:
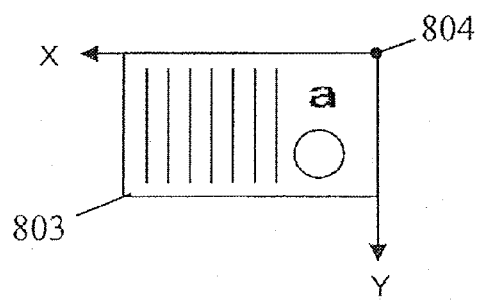
FIG. 8Ba is a diagram illustrating an example of a display orientation of a preview image according to the first embodiment.
Figure 8B:
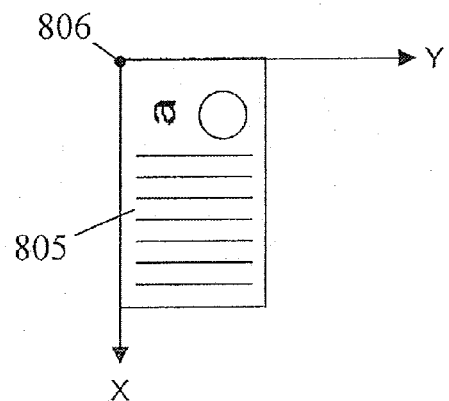

FIG. 8Ba is a diagram illustrating an example of various display orientations of a preview image according to the first embodiment. FIG. 8Bb is a diagram illustrating another example of the display orientation of a preview image according to the first embodiment.

Here, the orientation setting information 801 is information defining display orientation of the preview image being displayed. More specifically, the orientation setting information 801 is information defining direction of each axis in transformation of a plane coordinate system of the image data of the original into a plane coordinate system of the preview image.

For example, when the preview image display unit 405 acquires "Top Edge Top" 801a (upper edge on upper side) as the orientation setting information 801, as shown in FIGS. 7B and 8Ba, the origin of the image data 704 (the upper right corner 708) is the upper right corner 804 of the preview image 803; the X axis direction of the image data 704 is left direction of the preview image 803; and the Y axis direction of the image data 704 is down direction of the preview image 803. In this case, for example if the placing direction of the original is landscape orientation and the orientation setting information is "Top Edge Top", the display orientation of the preview image is landscape orientation (laterally long). The display orientation of the preview image is either portrait (the preview image is displayed vertically on the preview image window 703) or landscape (laterally on the preview image window 703).

On the other hand, when the preview image display unit 405 acquires "Top Edge Left" 801b as the orientation setting information 801, as shown in FIG. 8Bb, the origin of the image data 704 (the upper right corner 708) is the upper left corner 806 of the preview image 805; the X axis direction of the image data 704 is down direction of the preview image 805; and the Y axis direction of the image data 704 is right direction of the preview image 805. In this case, for example if the placing direction of the original is landscape orientation and the orientation setting information is "Top Edge Left", the display orientation of the preview image is portrait orientation (vertically long).

It should be noted that "upper edge" of "Top Edge Top" (and "Top Edge Left") is an edge of image data (or an original) in the X axis direction from the origin 706 of the platen 101 (platen glass), in other words, an upper edge of an original placed on the platen 101. Given this, "Top Edge Top" indicates that an upper edge of image data being read is directed upward (an upper edge of an original placed on the platen 101 is directed upward) and "Top Edge Left" indicates that an upper edge of image data being read is directed leftward (an upper edge of an original placed on the platen 101 is directed leftward). From another point of view, "upper edge" of "Top Edge Top" (and "Top Edge Left") can be considered to be an upper edge of an original in a proper orientation. Here, "Top Edge Top" indicates that, when the original is placed on the platen 101, the upper edge of the original is directed to an upper side of the platen 101, and "Top Edge Left" indicates that the upper edge of the original is directed to a left side of the platen 101.

The preview image display unit 405 displays the preview image on the preview image window 703 in the display direction corresponding to the orientation setting information (FIG. 6; S203).

Here, the preview image display unit 405 notifies the orientation setting information acquisition unit 407 of display of the preview image. In response to the notification, the orientation setting information acquisition unit 407 acquires the orientation setting information 801 from the orientation setting information table 800 (FIG. 6; S204).

The orientation setting information acquisition unit 407 notifies the tab display acceptance unit 408 of acquisition of the orientation setting information 801.

In response to the notification, the tab display acceptance unit 408 reads data of a tab display window that is stored in advance in a tab display window storage unit 409, and includes the orientation setting information 801 acquired by the orientation setting information acquisition unit 407 in a tab key in the tab display window (displays content of the orientation setting information on the tab key).

Figure 9A:
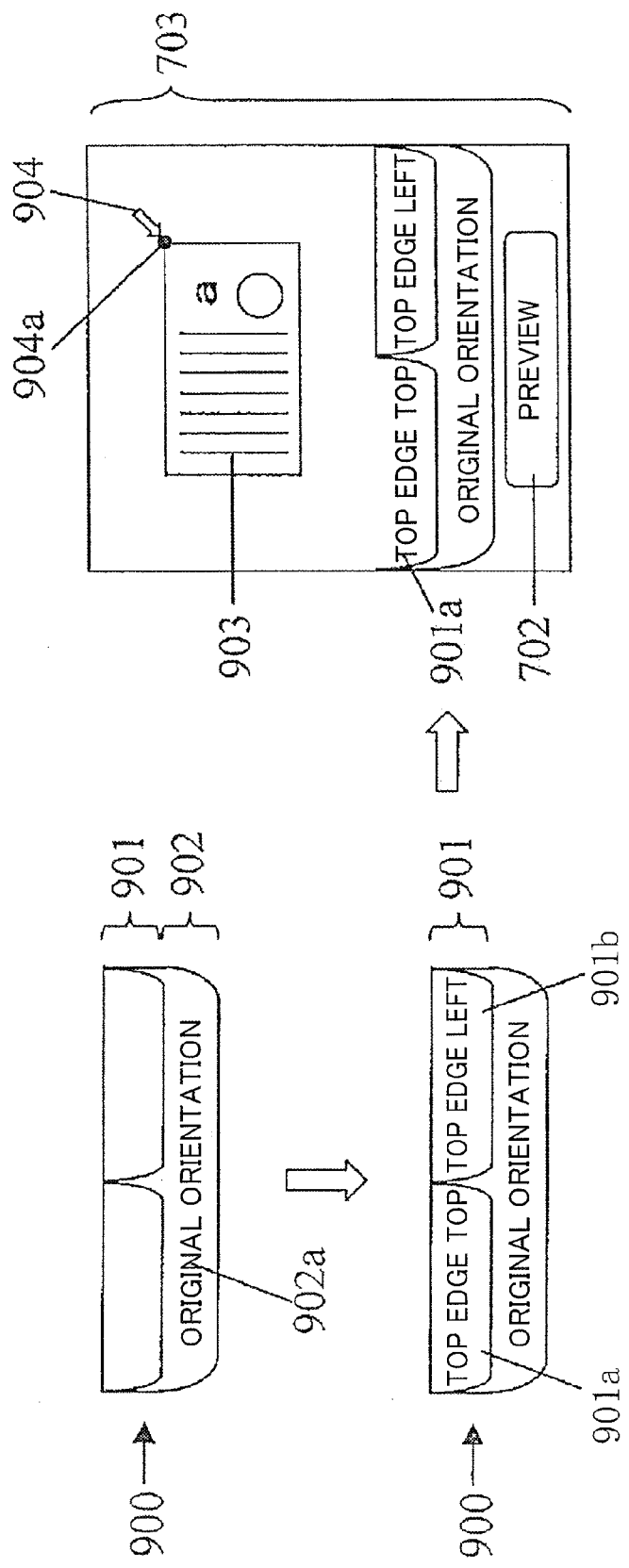
FIG. 9A is a diagram illustrating an example of a tab display window according to the first embodiment.

FIG. 9A is a diagram illustrating an example of the tab display window according to the first embodiment.

As shown in FIG. 9A, the tab display window 900 is configured to be substantially laterally long and to be included in a part of a display region of the preview image window 703. A display region of the tab display window 900 is vertically divided in two. In an upper display region 901, the number of tabs corresponding to the number of the orientation setting information 801 are aligned laterally not to overlap each other.

In a lower display region 902, a message "Original Orientation" is disposed (displayed) to indicate that the abovementioned number of tab keys corresponds to kinds of display orientations of the preview image.

The tab display acceptance unit 408 disposes (displays) the orientation setting information 801 ("Top Edge Top" 801a and "Top Edge Left" 801b) in a predetermined order (for example, in an order of acquisition of the orientation setting information 801 from the orientation setting information table 800) from a leftmost tab key 901a. Thereafter, the tab display acceptance unit 408 selectably displays the tab key including the orientation setting information 801 immediately below the preview image in the preview image window 703 (FIG. 6; S205). Here, the Preview key 702 is displayed immediately below the tab display window 900 in the preview image window 703.

The tab display acceptance unit 408 notifies a display adjustment unit 410 of display of the tab keys corresponding to the orientation setting information 801.

In response to the notification, the display adjustment unit 410 acquires the orientation setting information corresponding to the display orientation of the preview image 903 ("Top Edge Top" 801a) from the preview image display unit 405, and displays the tab key corresponding to the orientation setting information thus acquired ("Top Edge Top" 801a), in other words a "Top Edge Top" key 901a, on the touch screen 201 such that the "Top Edge Top" key 901a is seamlessly displayed with the preview image 903 (FIG. 6; S206) (the "Top Edge Top" key 901a is displayed on the same window as the preview image 903).

In addition, the display adjustment unit 410 displays a marker 904 (for example, an arrow) indicating the origin 706 (reading reference position), which is a position of alignment of original on the platen 705, at a reference position 904a of the preview image 903 corresponding to a reference position (origin) of the original image data 704 on the touch screen 201 (FIG. 6; S207).

Figure 9B:
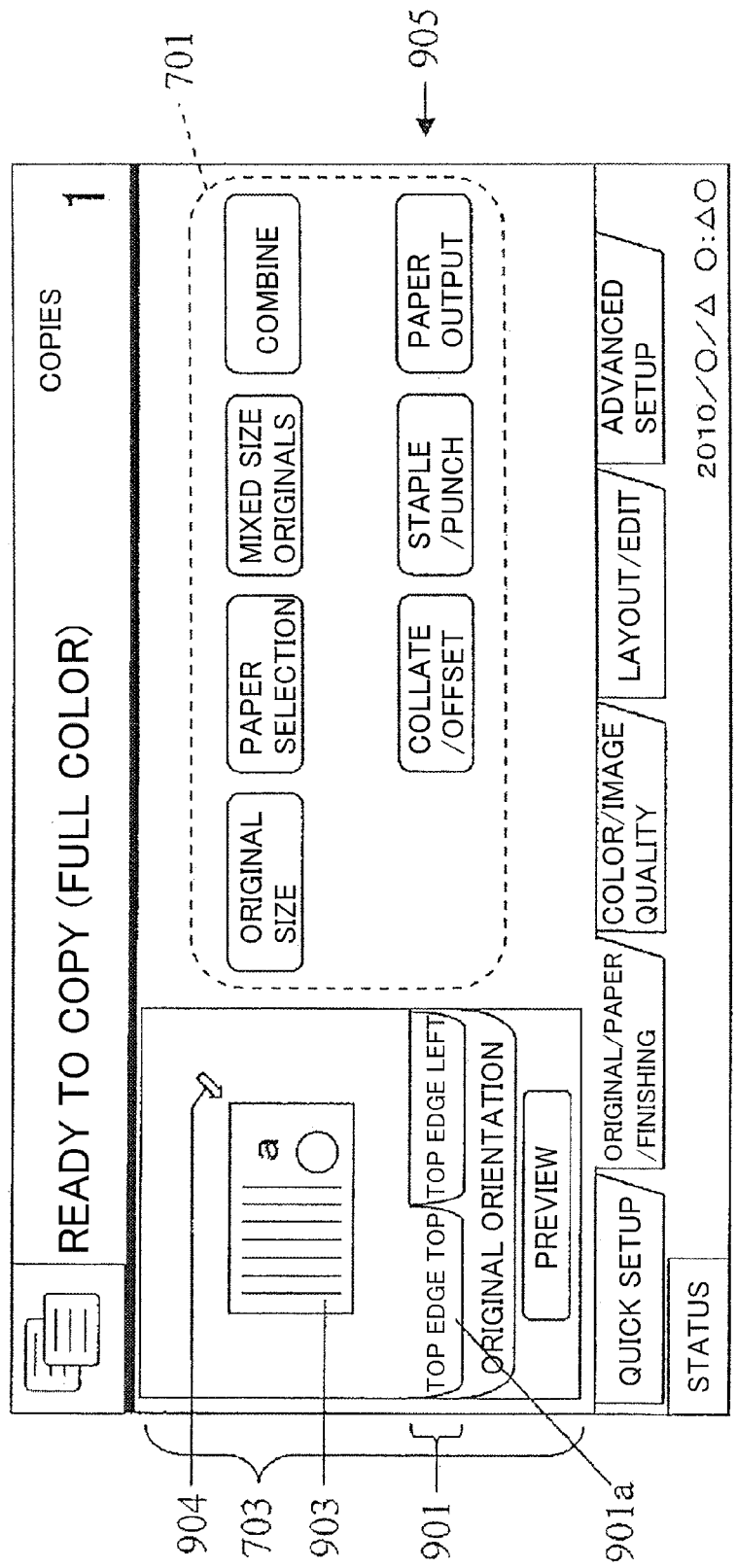
FIG. 9B is a diagram illustrating an example of the copy function window displaying the tab display window according to the first embodiment.

FIG. 9B is a diagram illustrating an example of the copy function window displaying the tab display window according to the first embodiment.

In the copy function window 905, as shown in FIG. 9B, in addition to the setting item key 701, the tab keys 901a, 901b corresponding to various display orientation of the preview image 903 are selectably displayed within the preview image window 703 while the tab key indicating the current display orientation of the preview image 903, namely the "Top Edge Top" key 901a, is seamlessly displayed with the preview image 903. In addition, the marker 904 is displayed at the reference position on the preview image 903.

As a result, by visually recognizing the tab key seamlessly displayed with the preview image 903 ("Top Edge Top" key 901a), the user can easily confirm that the orientation setting information ("Top Edge Top") displayed on the tab key ("Top Edge Top" key 901a) corresponds to the display orientation of the preview image 903.

Therefore, misunderstanding or confusion of the user not knowing whether placement of the original is wrong or the preview image window 703 is wrong can be avoided by confirming the display orientation of the preview image 903, thereby improving visibility and operability of the multifunction peripheral 100 (operation unit 102) for the user.

In addition, by visually recognizing the marker 904, the user can easily confirm the origin 706, which is a position of alignment of the original 707 that is placed, based on the marker 904.

Therefore, the multifunction peripheral 100 can allow a user to easily understand a difference between the placing orientation of the original 707 and the display orientation of the preview image 903, thereby avoiding the abovementioned misunderstanding or confusion.

Here, for example as shown in FIGS. 7B and 9B, in a case in which a laterally long original 707 with text written vertically is placed on the platen 101 in landscape orientation and the preview image 903 corresponding thereto is displayed in landscape orientation with the orientation setting information "Top Edge Top", text lines in the preview image 903 are displayed vertically. In other words, the preview image 903 represents the image of the original 707 as is, causing no problem.

In this case, for example if the user selects a predetermined setting item key 701 (FIG. 5; S103YES) without selecting a specific tab key while looking at the preview image 903 (FIG. 6; S208NO), and the window display acceptance unit 401 accepts the selection of the setting item key 701 (FIG. 5: S104), input of inappropriate setting conditions is not likely.

Figure 10A:
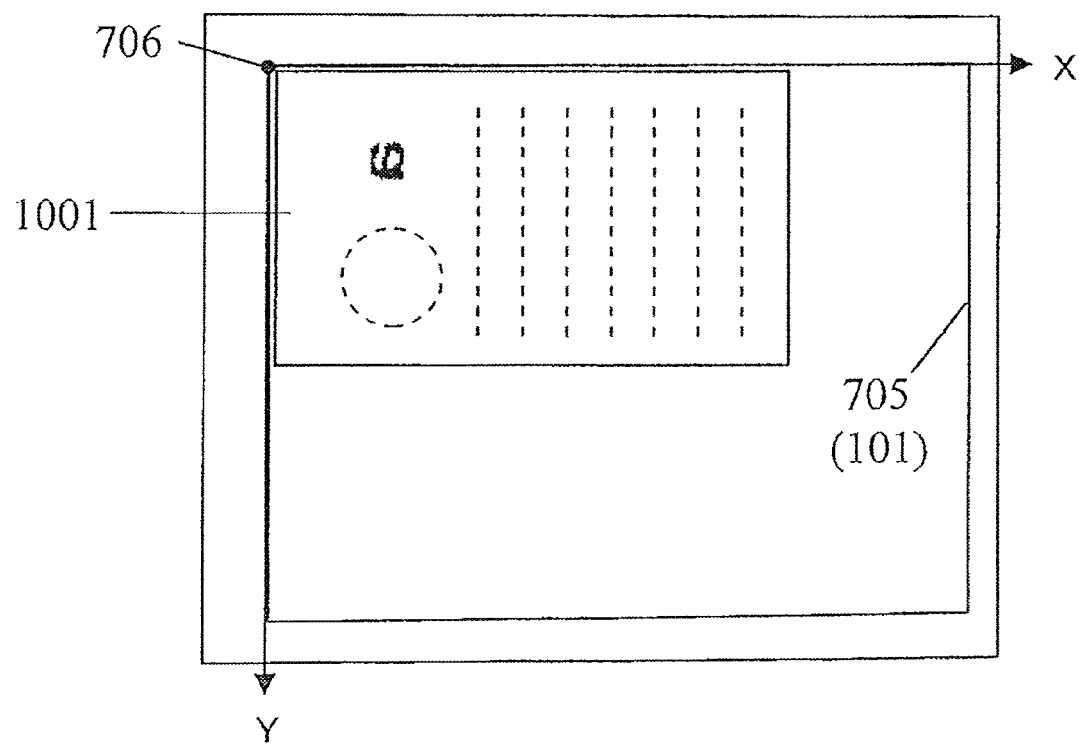
FIG. 10A is a diagram illustrating an example of a case according to the first embodiment, in which a vertically long original with text written laterally is placed in landscape orientation.
Figure 10B:
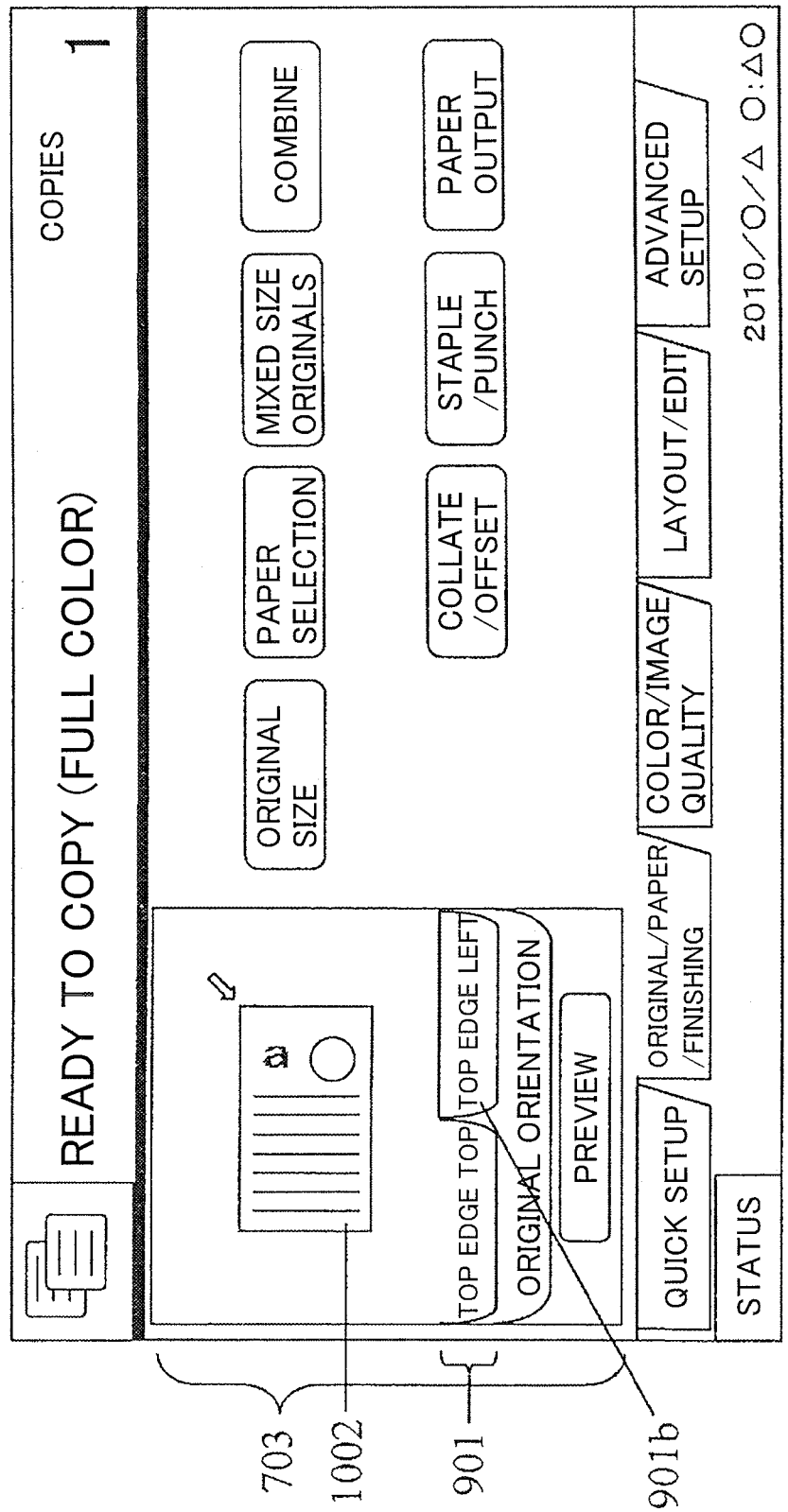
FIG. 10B is a diagram illustrating an example of a case according to the first embodiment, in which a preview image of a vertically long original with text written laterally is displayed in landscape orientation.

FIG. 10A is a diagram illustrating an example of a case according to the first embodiment, in which a vertically long original with text written laterally is placed in landscape orientation. FIG. 10B is a diagram illustrating an example of a case according to the first embodiment, in which a preview image of a vertically long original with text written laterally is displayed in landscape orientation.

On the other hand, for example as shown in FIGS. 10A and 10B, in a case in which a vertically long original 1001 with text written laterally is placed on the platen 101 in landscape orientation and the preview image 1002 corresponding thereto is displayed in landscape orientation with the orientation setting information "Top Edge Top", text lines in the preview image 1002 that should be displayed laterally are displayed vertically. In such a case, contents of the preview image 1002 are difficult for the user to confirm and it is obvious that the display orientation of the preview image is inappropriate.

In this case, looking at the preview image 1002, by selecting the specific tab key that is not seamlessly displayed with the preview image 1002 (for example, "Top Edge Left" key 901b) (FIG. 6; S208YES), the tab display acceptance unit 408 accepts the selection of the specific tab key and notifies the display orientation changing unit 411 of the selection.

In response to the notification, the display orientation changing unit 411 changes the display orientation of the preview image 1002 displayed by the preview image displaying unit 405 to the display orientation corresponding to the orientation setting information included in the tab key thus selected (FIG. 6; S209).

The preview image 1002 currently displayed corresponds to the orientation setting information "Top Edge Top" 801a, and has the origin of the image data as an upper right corner; an X axis direction of the image data as a left direction; and a Y axis direction of the image data as a down direction.

Given this, the display orientation changing unit 411 makes the preview image 1002 correspond to the orientation setting information "Top Edge Left" 801b (901b), have the origin as an upper left corner; an X axis direction of the image data as a down direction; and a Y axis direction of the image data as a right direction.

As a result, the preview image 1002 rotates 90 degrees counterclockwise, the display orientation of the preview image becomes portrait orientation, and text lines are displayed laterally.

After changing the display orientation of the preview image, the display orientation changing unit 411 notifies the display adjustment unit 410 of the change. In response to the notification, as in the above description, the display adjustment unit 410 acquires the orientation setting information of the preview image after the change ("Top Edge Left" 801b) from the preview image display unit 405, and displays the tab key corresponding to the orientation setting information thus acquired ("Top Edge Left" 801b), in other words a "Top Edge Left" key 901b, on the touch screen 201 such that the "Top Edge Left" key 901b is seamlessly displayed with the preview image 1002 (FIG. 6; S206).

In addition, the display adjustment unit 410 displays a marker indicating the origin 706, which is a position of alignment of original on the platen 705, at a reference position of the preview image corresponding to a reference position 1004 (origin) of the image data 1002 of the original 1001 on the touch screen 201 (FIG. 6; S207).

FIG. 11A is a diagram illustrating an example of a case according to the first embodiment, in which a preview image of a vertically long original with text written laterally is displayed in portrait orientation.

As shown in FIG. 11A, the copy function window displays the preview image 1101 with text written laterally in portrait orientation, and a marker 1102 indicating a position of alignment of original in an upper left corner of the preview image 1101. In addition, the tab key corresponding to the display orientation of the preview image 1101, namely the "Top Edge Left" key 901b is displayed seamlessly with the preview image 1101.

This allows a user, with the multifunction peripheral 100, to easily change the display orientation of the preview image 1101 according to the content thereof, thereby displaying the preview image 1101 in an appropriate displaying orientation.

As a result, in the multifunction peripheral 100, misunderstanding or confusion of a user due to a display mode of the preview image 1101 can be avoided, thereby preventing input of inappropriate setting conditions by the user and miscopy.

When the user selects the combine key 701a, for example, among the setting item keys 701 while looking at the preview image 1101 shown in FIG. 11A (FIG. 5; S103YES), the window display acceptance unit 401 accepts the selection of the combine key 701a and adjusts to the display orientation of the preview image 1101 (portrait), and displays setting item keys relating to combine at a position where the setting item key can be more preferentially selected by a user than other setting item keys.

FIG. 11B is a diagram illustrating an example of a window displaying a setting item key for combine according to the first embodiment.

For example, as shown in FIG. 11B, when the display orientation of the preview image 1101 is portrait orientation, the setting item key suitable for portrait orientation, more specifically a "Lateral 2 in 1 Combine" key 1103 for laterally arranging and combining two pieces of image data into single image data, is selectably displayed in a central portion that is easily selected by the user.

This setting item key is suitable for combining two pieces of image data in portrait orientation into one.

The setting item key not suitable for image data in portrait orientation, more specifically a "Vertical 2 in 1 Combine" key 1104 for vertically arranging and combining two pieces of image data into single image data, is selectably displayed in a side portion that is not easily selected by the user.

This can smoothly encourage the user to input the setting conditions and can prevent inappropriate input of the setting conditions and miscopy.

As a position easily selected by the user, a region in the vicinity of the preview image can also be exemplified, as described above.

When the user selects the start key 205 (FIG. 5; S105YES) while looking at the copy function window, the window display acceptance unit 401 accepts the selection of the start key 205 and acquires the orientation setting information (for example, "Top Edge Left" 801*b*) of the preview image from the preview image displaying unit 405. And then, the window display acceptance unit 401 accepts the orientation setting information (for example, "Top Edge Left" 801*b*) of the preview image thus acquired, in other words setting information of the display orientation of the preview image, as information regarding the orientation of the image data for image formation (FIG. 5; S106).

The window display acceptance unit 401 then notifies the control unit 402 of the multifunction peripheral 100 of all the setting conditions. In response to the notification, the control unit 402 instructs the image forming unit 412 to perform image formation based on the setting conditions accepted before the selection of the start key 205. In response to the instruction, the image forming unit 412 executes image formation based on the setting conditions (FIG. 5; S107).

Upon execution of image formation, the image forming unit 412 acquires image data from the image data storage unit 404 and adjusts the orientation of the image data to the display orientation of the preview image. For example, if the display orientation of the preview image is "Top Edge Left", the origin of the image data is an upper left corner; an X axis direction of the image data is a down direction; and a Y axis direction of the image data is a right direction. Thereafter, the image forming unit 412 executes image formation based on the image data. In such a configuration, if the user inputs the setting conditions while looking at the preview image, the setting conditions are correctly reflected on the image formation, and a printed matter according to the preview image, in other words a desired printed matter, can be obtained. In addition, miscopy can thus be suppressed.

It should be noted that, in step S102, if the user selects a predetermined setting item key 701 in the copy function window 700 (FIG. 5; S103YES) without selecting the Preview key 702 (FIG. 5; S102NO), the window display acceptance unit 401 accepts the selection of the setting item key 701 (FIG. 5: S104). This applies to a case in which there is no need for inputting setting conditions using a preview image, for example a case in which a user wishes to simply output a copy by placing an original on the platen 101 and selecting the start key 205.

In addition, in step S105, if the user does not select the start key 205 (FIG. 5; S105NO), processing returns to S102 where the window display acceptance unit 401 accepts the selection of the preview key (FIG. 5: S102) and the selection of the setting item key (FIG. 5; S103).

The operation unit 102 according to the first embodiment includes: the touch screen 201 that can display a setting item window displaying predetermined setting item keys and a preview image window displaying a preview image corresponding to original image data in a preset display orientation and selectably displays the setting item keys;

the orientation setting information storage unit 406 that stores orientation setting information regarding the display orientation of the preview image;

the orientation setting information acquisition unit 407 that acquires the orientation setting information from the orientation setting information storage unit 406 when the preview image is displayed on the preview image window in the predetermined display orientation;

the tab display acceptance unit 408 that selectably displays a tab key on the preview image window, the tab key including the orientation setting information acquired from the orientation setting information acquisition unit; and the display adjustment unit 410 that displays the tab key seamlessly with the preview image on the touch screen, the tab key including the orientation setting information corresponding to the display orientation of the preview image displayed on the preview image window.

As a result, by visually recognizing the tab key seamlessly displayed with the preview image, the user can easily confirm that the orientation setting information displayed on the tab key corresponds to the display orientation of the preview image. With the operation unit 102, misunderstanding or confusion of the user not knowing whether placement of the original is wrong or the preview image is wrong can be avoided by confirming the display orientation of the preview image, thereby improving visibility and operability for the user.

Although the orientation setting information "Top Edge Top" and "Top Edge Left" are exemplified in the first embodiment, the present invention is not limited thereto and "Top Edge Right" and "Top Edge Down" can also be employed. Alternatively, rotational angle of a preview image can be shown as the orientation setting information.

Second Embodiment

Next, a second embodiment of the present invention is described.

The multifunction peripheral 100A according to the second embodiment is described hereinafter.

A difference from the first embodiment is mainly described and specific descriptions of similar components to the first embodiment are omitted.

An overall internal structure of the multifunction peripheral 100A according to the second embodiment is the same as the overall internal structure of the multifunction peripheral according to the first embodiment, and the above description and disclosure of FIG. 1 can be employed.

Figure 12:
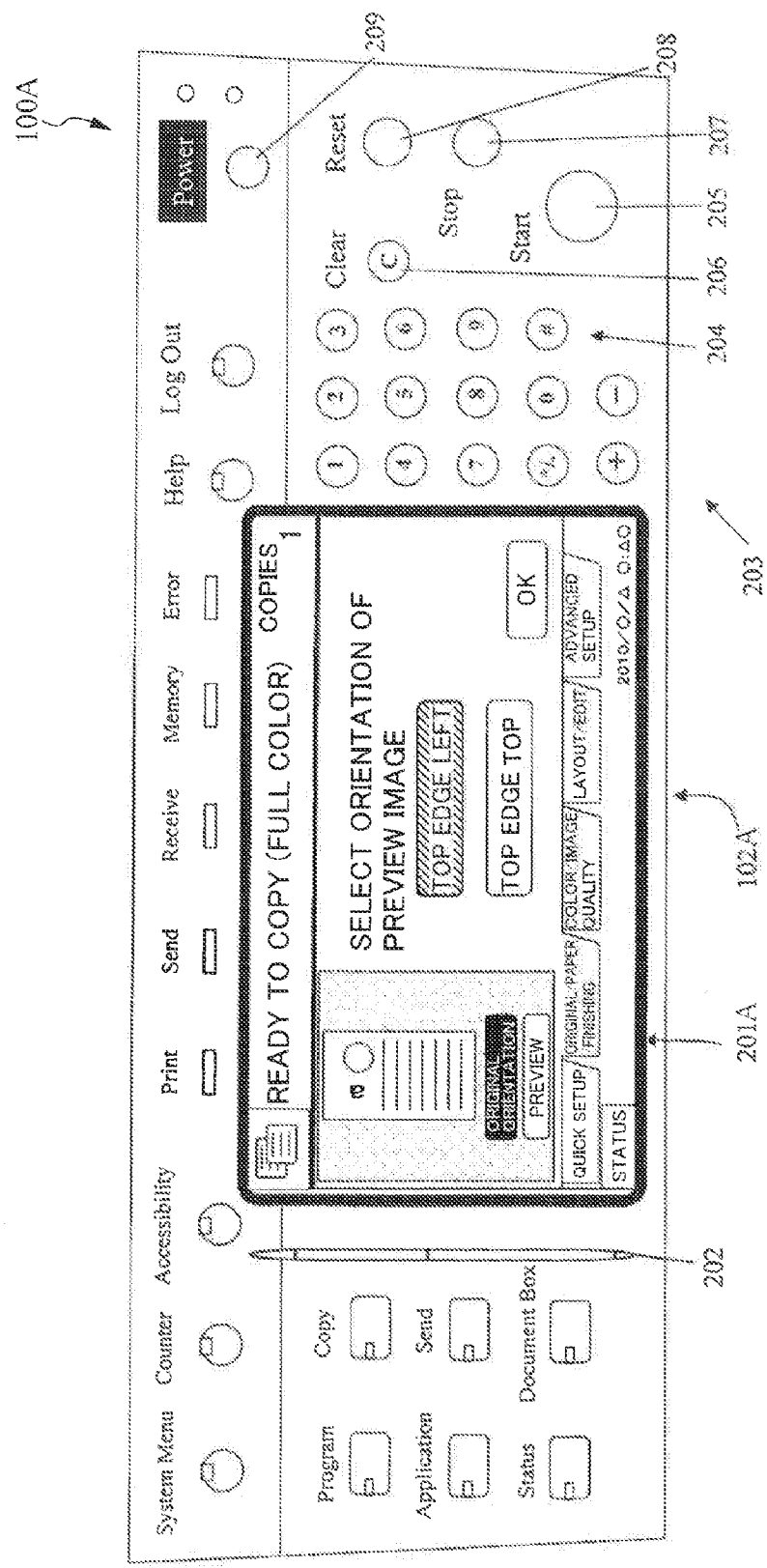
FIG. 12 is a schematic view illustrating the overall configuration of the operation unit according to a second embodiment.

Next, the operation unit 102A according to the second embodiment is described with reference to FIG. 12. FIG. 12 is a schematic view illustrating the overall configuration of the operation unit according to a second embodiment.

An overall structure of the operation unit 102A of the multifunction peripheral 100A according to the second embodiment is the same as the operation unit 102 according to the first embodiment, and the above description can be employed.

Here, contents displayed on the touch screen 201A according to the second embodiment are different from the contents displayed on the touch screen 201 according to the first embodiment. The contents displayed on the touch screen 201A according to the second embodiment are described later.

Figure 13:
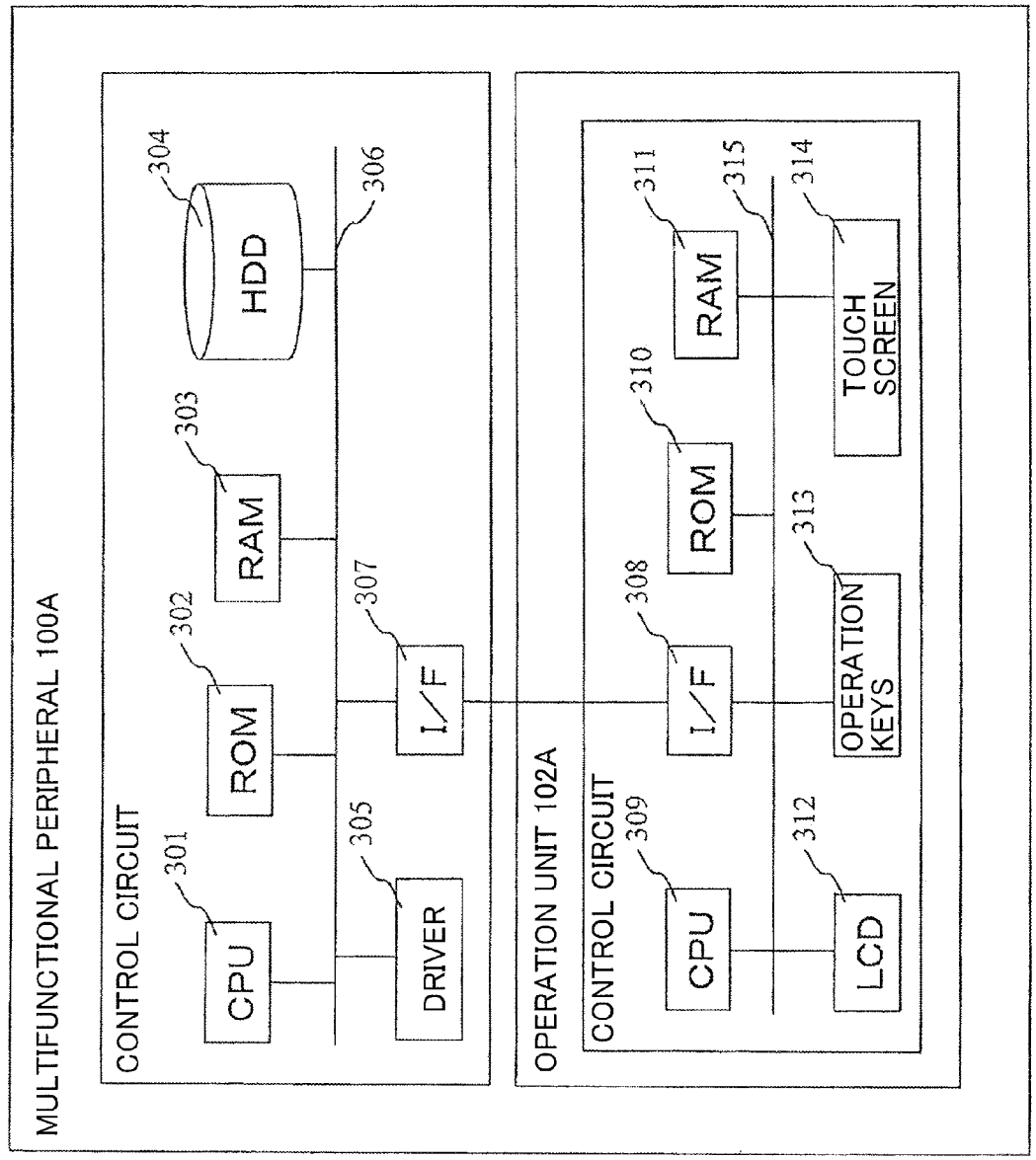
FIG. 13 is a diagram illustrating a hardware configuration of a control system of the multifunction peripheral and the operation unit according to the second embodiment.

Next, a hardware configuration of a control system of the multifunction peripheral 100A and the operation unit 102A according to the second embodiment is described with reference to FIG. 13. FIG. 13 is a diagram illustrating a hardware configuration of a control system of the multifunction peripheral 100A and the operation unit 102A according to the second embodiment.

A hardware configuration of a control system of the multifunction peripheral 100A and the operation unit 102A according to the second embodiment is the same as the hardware configuration of a control system of the multifunction peripheral 100 and the operation unit 102 according to the first embodiment, and the above description can be employed.

Figure 14:
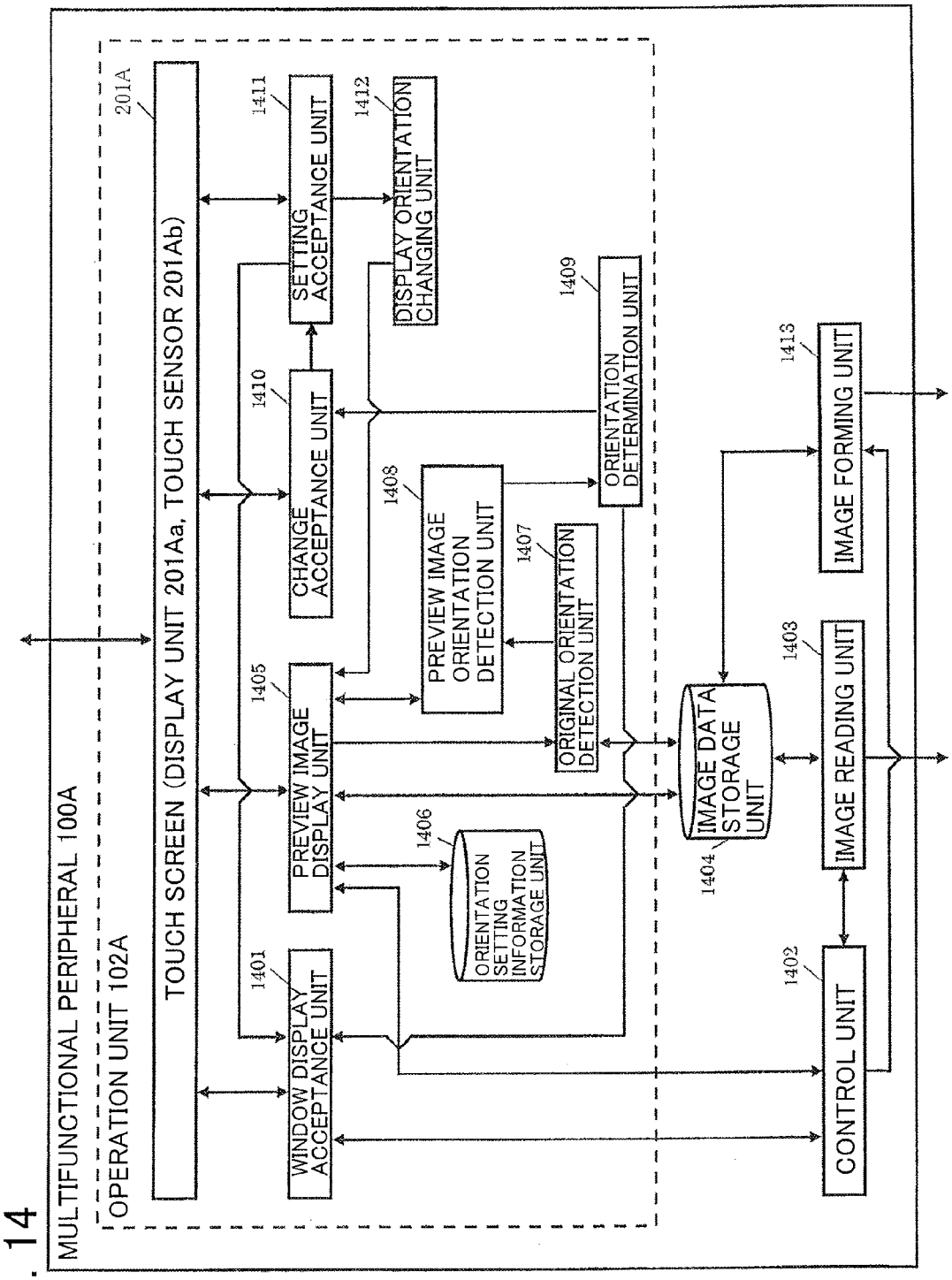
FIG. 14 is a functional block diagram of the multifunction peripheral and the operation unit according to the second embodiment.
Figure 15:
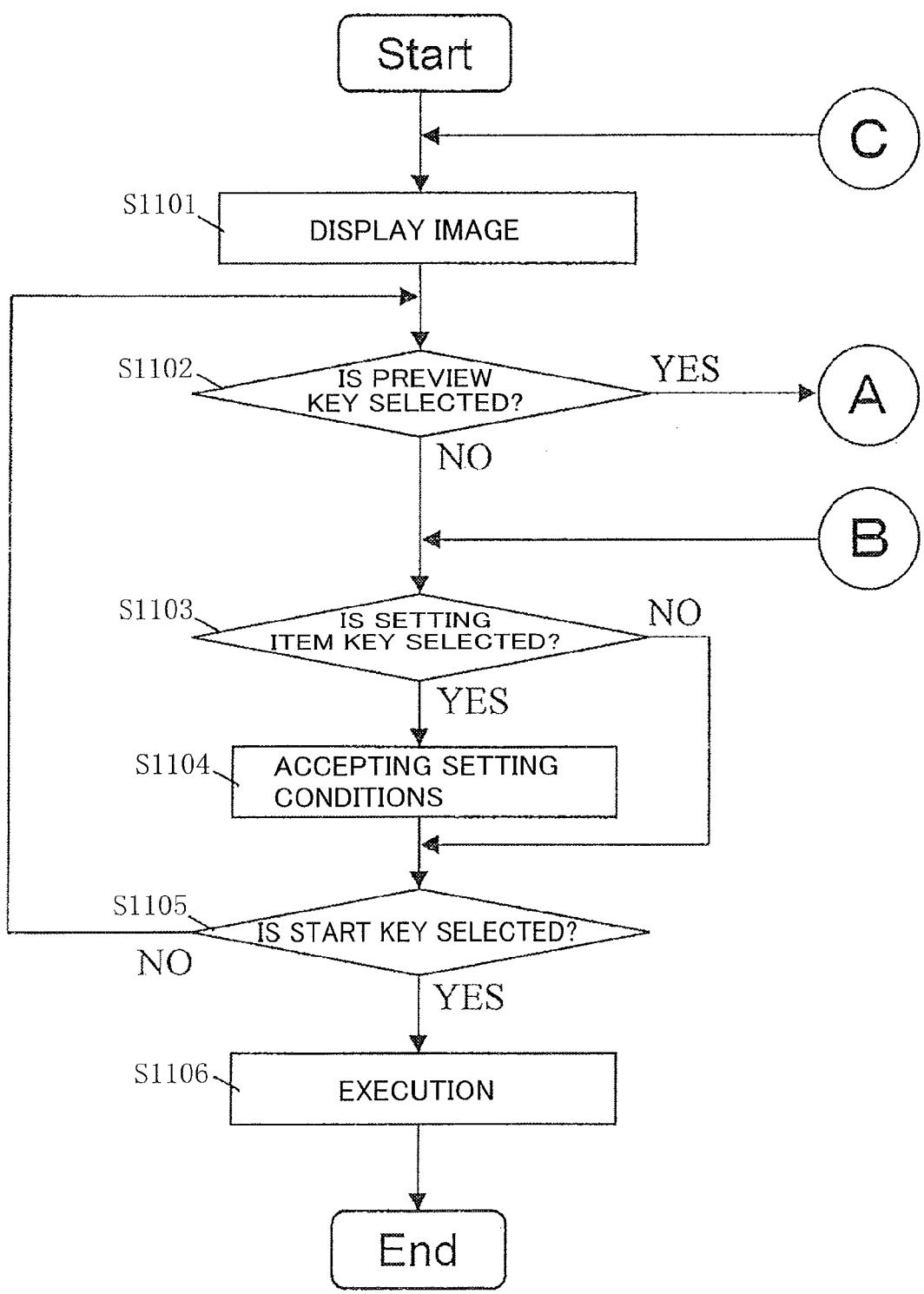
FIG. 15 is a first flowchart showing an execution procedure of the second embodiment.
Figure 16:
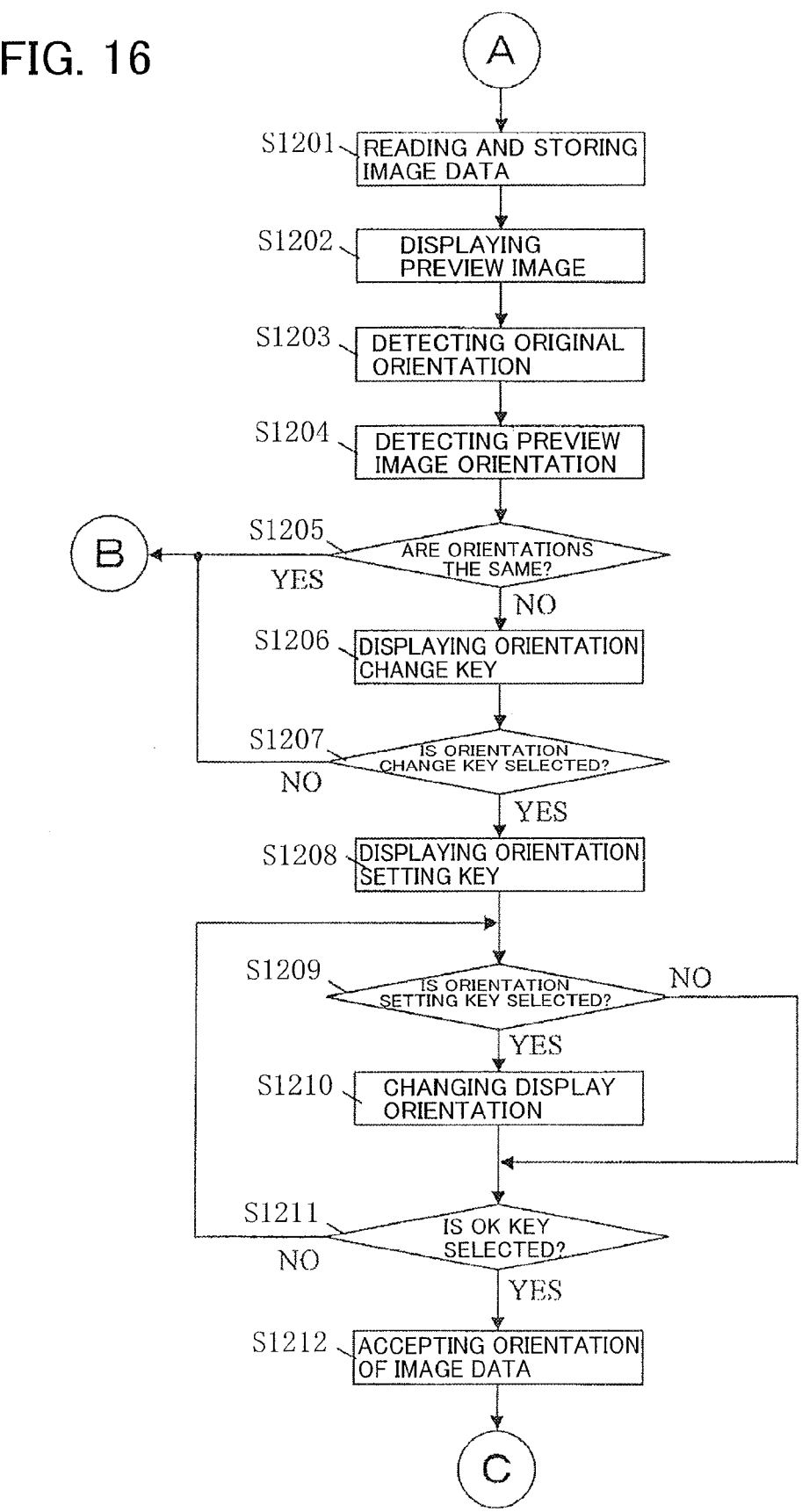
FIG. 16 is a second flowchart showing an execution procedure of the second embodiment.

Next, a configuration and execution procedure according to the second embodiment is described with reference to FIGS. 14 to 16. FIG. 14 is a functional block diagram of the multifunction peripheral and the operation unit according to the second embodiment. FIG. 15 is a first flowchart showing an execution procedure of the second embodiment. FIG. 16 is a second flowchart showing an execution procedure of the second embodiment.

First, when a user turns on the multifunction peripheral 100A, the operation unit 102A is activated upon activation of the multifunction peripheral 100A. And then, a window display acceptance unit 1401 of the operation unit 102A displays a preset initial window (for example, a copy function window) on the touch screen 201A (FIG. 15; S1101).

Figure 17A:
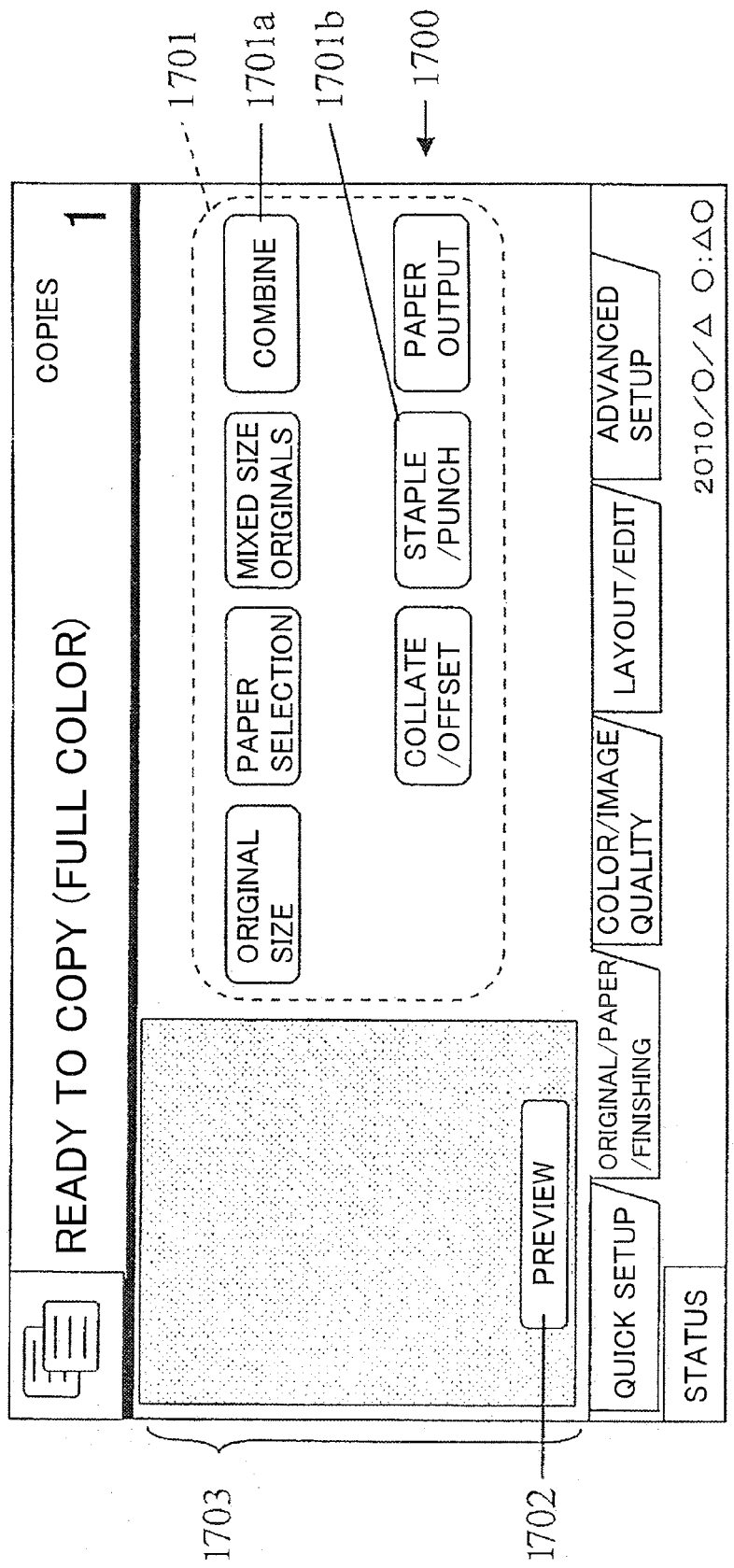
FIG. 17A is a diagram illustrating an example of a copy function window displayed on the touch screen according to the second embodiment.

FIG. 17A is a diagram illustrating an example of a copy function window displayed on the touch screen 201A according to the second embodiment.

As shown in FIG. 17A, setting item keys 1701 for condition setting of the copy service (for example, a combine key 1701a, punch/staple key 1701b and the like); a preview key 1702 for displaying image data of an original placed on the platen 101 as a preview image; and a preview image window 1703 displaying the preview image are displayed in the copy function window 1700.

Here, a user places an original P on a platen 101 disposed on an upper face of the multifunction peripheral 100 such that a target surface faces a surface of a platen 101

The placing orientation of the original is either portrait (the original is placed vertically on the platen 101) or landscape (laterally on the platen 101).

And then, when the user selects (presses) the preview key 1702 on the copy function window 1700 (FIG. 15; S1102YES), the window display acceptance unit 1401 accepts the selection of the preview key 1702 and notifies the control unit 1402 of the multifunction peripheral 100A of the selection.

In response to the notification, the control unit 1402 instructs the image reading unit 1403 to read an image of the original as image data. In response to the instruction, the image reading unit 1403 reads the image of the original on the platen 101, generates the image data, and stores the image data to an image data storage unit 1404 (FIG. 16; S1201).

A case in which the user does not select the preview key 1702 (FIG. 15; S1102NO) is described later.

Figure 17B:
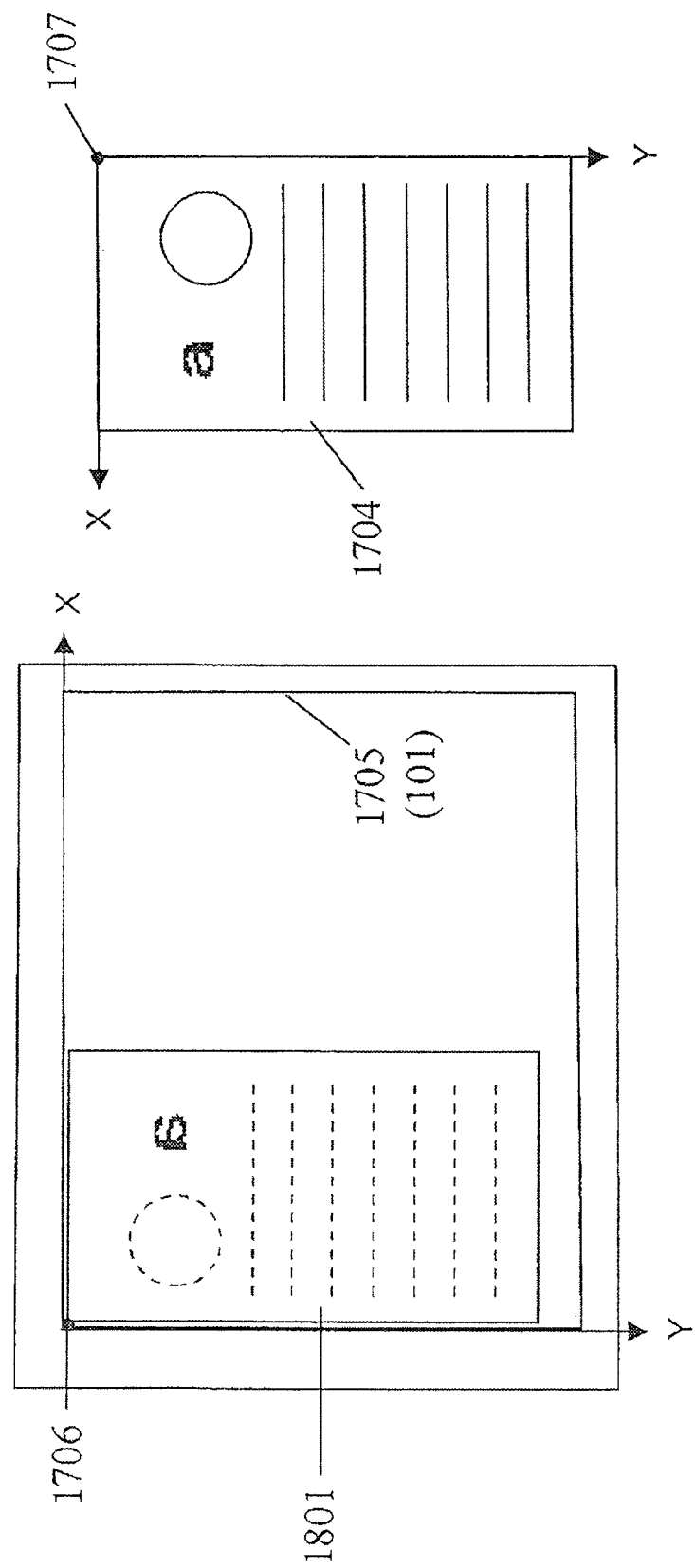
FIG. 17B is a diagram illustrating an example of a relationship between an orientation of original image data and the main scanning direction and the sub scanning direction according to the second embodiment.

FIG. 17B is a diagram illustrating an example of a relationship between an orientation of original image data and the main scanning direction and the sub scanning direction according to the second embodiment.

Here, as shown in FIG. 17B, it is defined in advance: an upper left corner of the platen 1705 as an origin 1706 (reference point 0); a right direction from the origin 1706 as a sub-scanning direction; and a down direction therefrom as a main scanning direction.

The image data 1704 of the original placed on the platen 1705 is image data of a reverse side of the original shown in FIG. 17B. Therefore, the image data is stored in such a way that the origin is an upper right corner 1707; a left direction from the upper right corner 1707 is an X axis direction (sub-scanning direction); and a down direction therefrom is a Y axis direction (main scanning direction).

After storing the image data to the image data storage unit 1404, the image reading unit 1403 notifies the preview image display unit 1405 of the storage via the control unit 1402.

In response to the notification, the preview image display unit 1405 acquires the image data from the image data storage unit 1404 and generates a preview image corresponding to the image data.

Next, the preview image display unit 1405 acquires the orientation setting information (for example, "Top Edge Top", "Top Edge Left" and the like) that is stored in advance in the orientation setting information storage unit 1406.

Figure 18A:
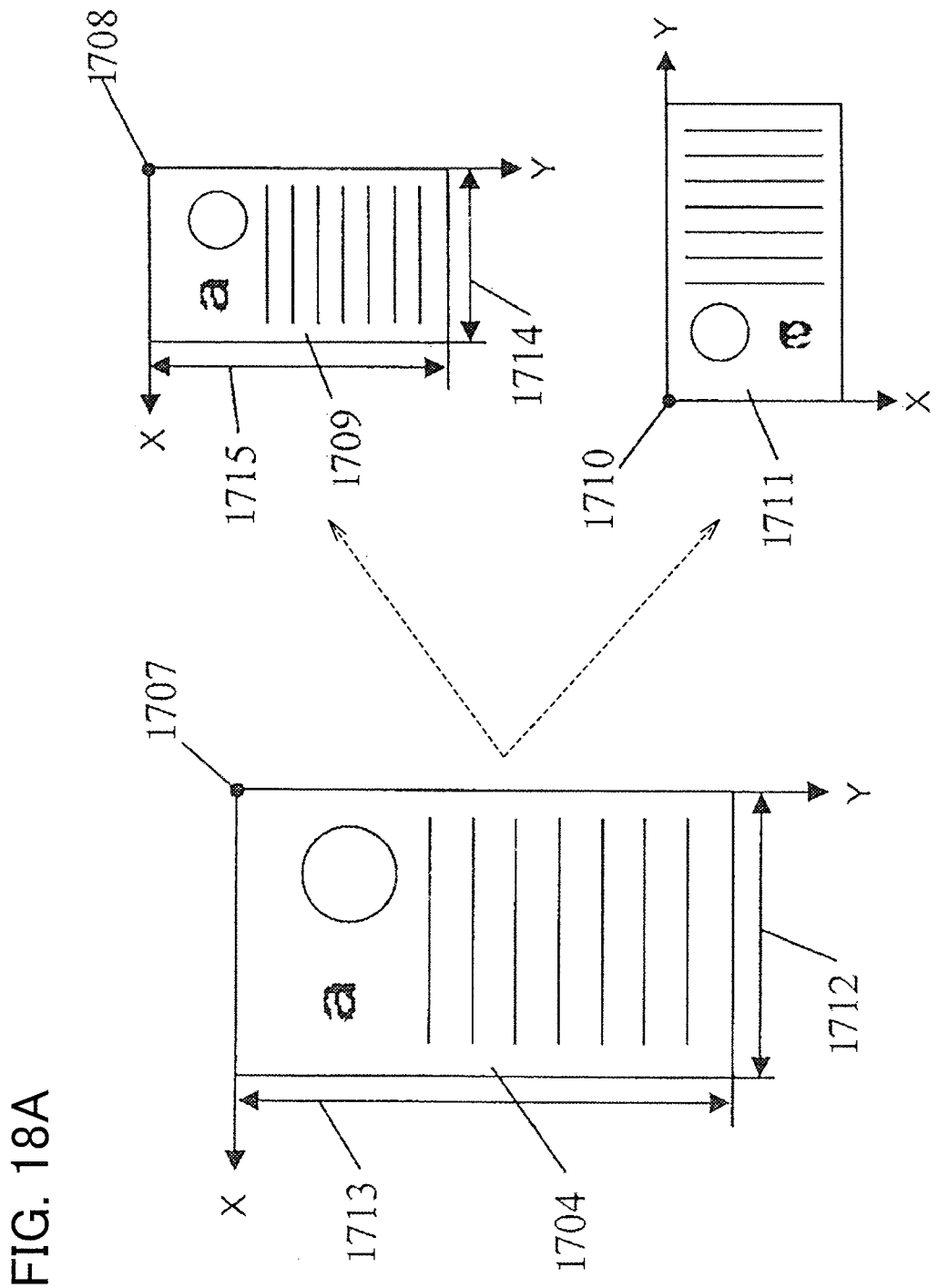
FIG. 18A is a diagram illustrating an example of various display orientations of a preview images according to the second embodiment.
Figure 18B:
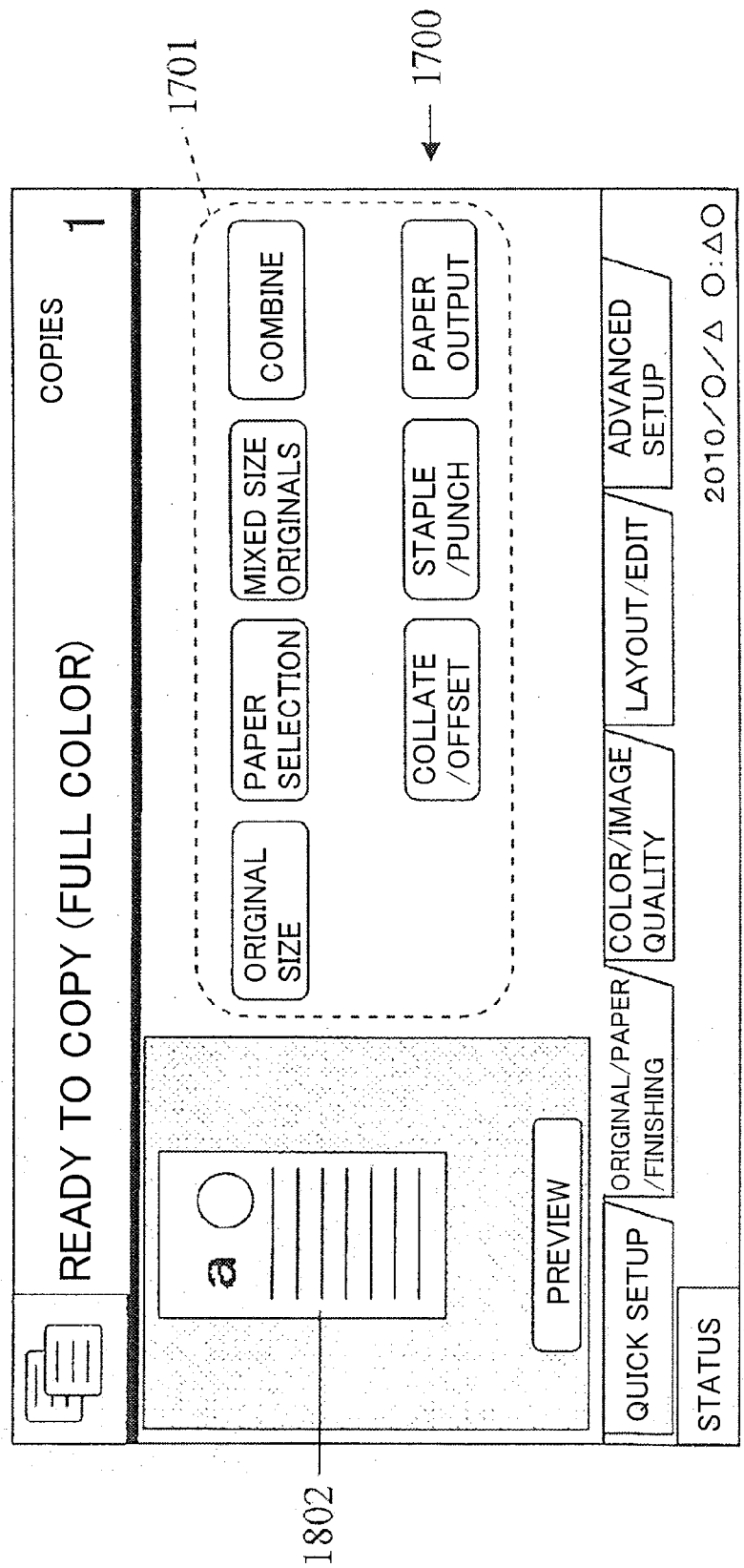
FIG. 18B is a diagram illustrating another example of a case according to the second embodiment, in which a preview image of a vertically long original with text written laterally is displayed in portrait orientation.

FIG. 18A is a diagram illustrating an example of various display orientations of a preview image according to the second embodiment. FIG. 18B is a diagram illustrating another example of a case according to the second embodiment, in which a preview image of a vertically long original with text written laterally is displayed in portrait orientation.

Here, the orientation setting information is information defining display orientation of the preview image being displayed.

More specifically, the orientation setting information 801 is information defining direction of each axis in transformation of a plane coordinate system of the image data of the original into a plane coordinate system of the preview image.

For example, when the preview image display unit 1405 acquires "Top Edge Top" 801a (upper edge on upper side) as the orientation setting information, the origin of the image data 1704 (the upper right corner 1707) is the upper right corner 1707 of the preview image 1708; the X axis direction of the image data 1704 is left direction of the preview image 1708; and the Y axis direction of the image data 1704 is down direction of the preview image 1708, as shown in FIG. 18A.

In this case, for example if the placing direction of the original is portrait orientation and the orientation setting information is "Top Edge Top", the display orientation of the preview image is portrait orientation (vertically long).

The display orientation of the preview image is either portrait (the preview image is displayed vertically on the preview image window 1703) or landscape (laterally on the preview image window 1703).

On the other hand, when the preview image display unit 1405 acquires "Top Edge Left" as the orientation setting information, the origin of the image data 1704 (the upper right corner 1707) is the upper left corner 1710 of the preview image 1711; the X axis direction of the image data 1704 is down direction of the preview image 1711; and the Y axis direction of the image data 1704 is right direction of the preview image 1711.

In this case, for example if the placing direction of the original is portrait orientation and the orientation setting information is "Top Edge Left", the display orientation of the preview image is landscape orientation (laterally long).

The preview image display unit 1405 displays the preview image on the preview image window 1703 in the display direction corresponding to the orientation setting information (FIG. 16; S1202).

Here, the preview image display unit 1405 notifies an original orientation detection unit 1407 of display of the preview image.

In response to the notification, the original orientation detection unit 1407 detects the placing orientation of the original placed on the platen 101 (FIG. 16; S1203).

A detection method of the placing orientation of the original is not particularly limited; for example, a method can be exemplified, as shown in FIG. 18A, in which: the original orientation detection unit 1407 refers to the image data in the image data storage unit 1404; compares a lateral length (in the X axis direction) 1712 to a vertical length (in the Y axis direction) 1713 of the image data 1704;

as a result of the comparison, the original orientation detection unit 1407 determines that the placing orientation of the original is portrait orientation if the lateral length 1712 is smaller than the vertical length 1713; and the placing orientation of the original is landscape orientation if the lateral length is greater than the vertical length.

After detecting the placing orientation of the original, the original orientation detection unit 1407 notifies a preview image orientation detection unit 1408 of the orientation.

In response to the notification, the preview image orientation detection unit 1408 detects the display orientation of the preview image displayed in the copy function window 1700 (FIG. 16; S1204).

A detection method of the orientation of the preview image is not particularly limited; for example, a method can be exemplified, as described above, in which: the preview image orientation detection unit 1408 refers to the image data in the preview image currently displayed; compares a lateral length 1714 to a vertical length 1715 of the preview image as shown in FIG. 18A;

as a result of the comparison, the preview image orientation detection unit 1408 determines that the display orientation of the preview image is portrait orientation if the lateral length 1714 is smaller than the vertical length 1715; and the display orientation of the preview image is landscape orientation if the lateral length 1714 is greater than the vertical length 1715.

After detecting the display orientation of the preview image, the preview image orientation detection unit 1408 notifies an orientation determination unit 1409 of the display orientation.

In response to the notification, the orientation determination unit 1409 determines whether the display orientation of the preview image is the same as the placing orientation of the original (FIG. 16; S1205).

As a result of the determination, if the display orientation of the preview image (for example, portrait orientation) is the same as the placing orientation of the original (portrait orientation) (FIG. 16; S1205YES), the orientation determination unit 1409 notifies the window display acceptance unit 1401 of the result. In response to the notification, the window display acceptance unit 1401 accepts an input of setting conditions from a user via the copy function window 1700 (FIG. 15; S1103).

FIG. 18B is a diagram illustrating another example of a case according to the second embodiment, in which a preview image of a vertically long original with text written laterally is displayed in portrait orientation.

For example, as shown in FIGS. 17A and 18B, in a case in which: the placing orientation of the original 1801 placed on the platen 101 is portrait orientation; the orientation setting information is "Top Edge Top"; and the display orientation of the corresponding preview image is portrait orientation, the preview image 1802 reflects image of the original as is.

In this case, it is not necessary to change the display orientation of the preview image and, if a user selects a specific setting item key 1701 in the copy function window 1700 while looking at the preview image 1802 (FIG. 15; S1103YES), input of inappropriate setting conditions is not likely.

The window display acceptance unit 1401 accepts the selection of the setting item key 1701 (FIG. 15; S1104).

On the other hand, as a result of the determination, if the display orientation of the preview image is not the same as the placing orientation of the original (FIG. 16; S1205NO), the orientation determination unit 1409 notifies a change acceptance unit 1410 of the result.

In response to the notification, the change acceptance unit 1410 selectably displays, on the touch screen, an orientation change key (also referred to as an original set orientation key) for changing the display orientation of the preview image (FIG. 16; S1206).

Figure 19B:
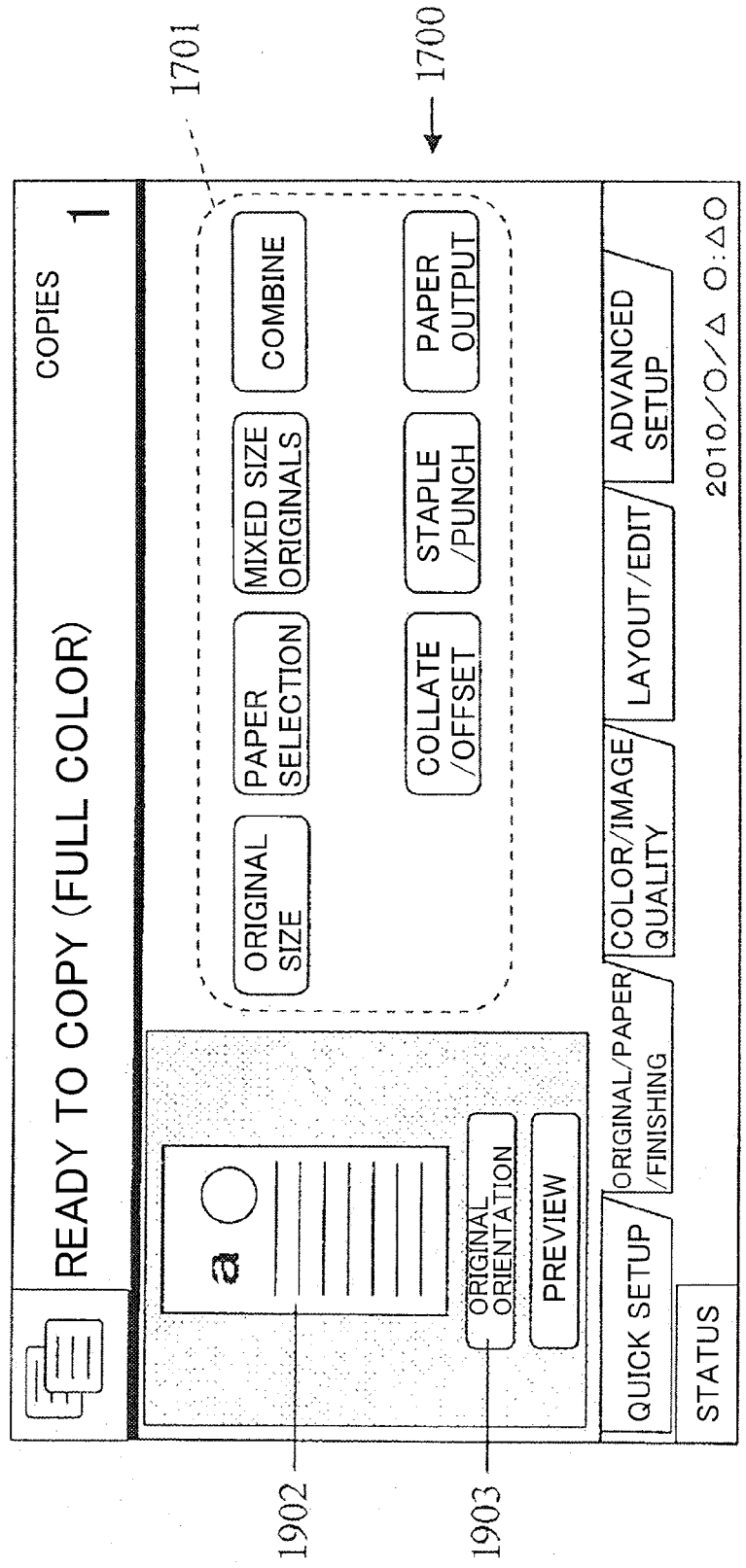
FIG. 19B is a diagram illustrating an example of a case according to the second embodiment, in which a preview image of a vertically long original with text written laterally is displayed in portrait orientation.

FIG. 19A is a diagram illustrating an example of a case according to the second embodiment, in which a vertically long original with text written laterally is placed in landscape orientation. FIG. 19B is a diagram illustrating an example of a case according to the second embodiment, in which a preview image of a vertically long original with text written laterally is displayed in portrait orientation.

For example, as shown in FIGS. 19A and 19B, in a case in which: the placing orientation of the original 1901 placed on the platen 101 is landscape orientation; the orientation setting information is "Top Edge Left"; and the display orientation of the corresponding preview image is portrait orientation, the placing orientation of the original 1901 is not the same as the display orientation of the preview image 1902.

Given this, the change acceptance unit 1410 selectably displays the orientation change key 1903 below the preview image 1902.

Here, for example as shown in FIGS. 19A and 19B, in a case in which a vertically long original 1901 with text written laterally is placed on the platen 101 in landscape orientation and the preview image 1902 corresponding thereto is displayed in portrait orientation with the orientation setting information "Top Edge Left", text lines in the preview image 1902 are correctly displayed laterally.

In this case, if the user selects a predetermined setting item key 1701 (FIG. 15; S1103YES) in the copy function window 1700 without selecting the orientation change key 1903 (FIG. 16; S1207NO) while looking at the preview image 1902, the window display acceptance unit 1401 accepts the selection of the setting item key 1701 (FIG. 15: S1104) and conditions for the setting item are input.

Figure 20A:
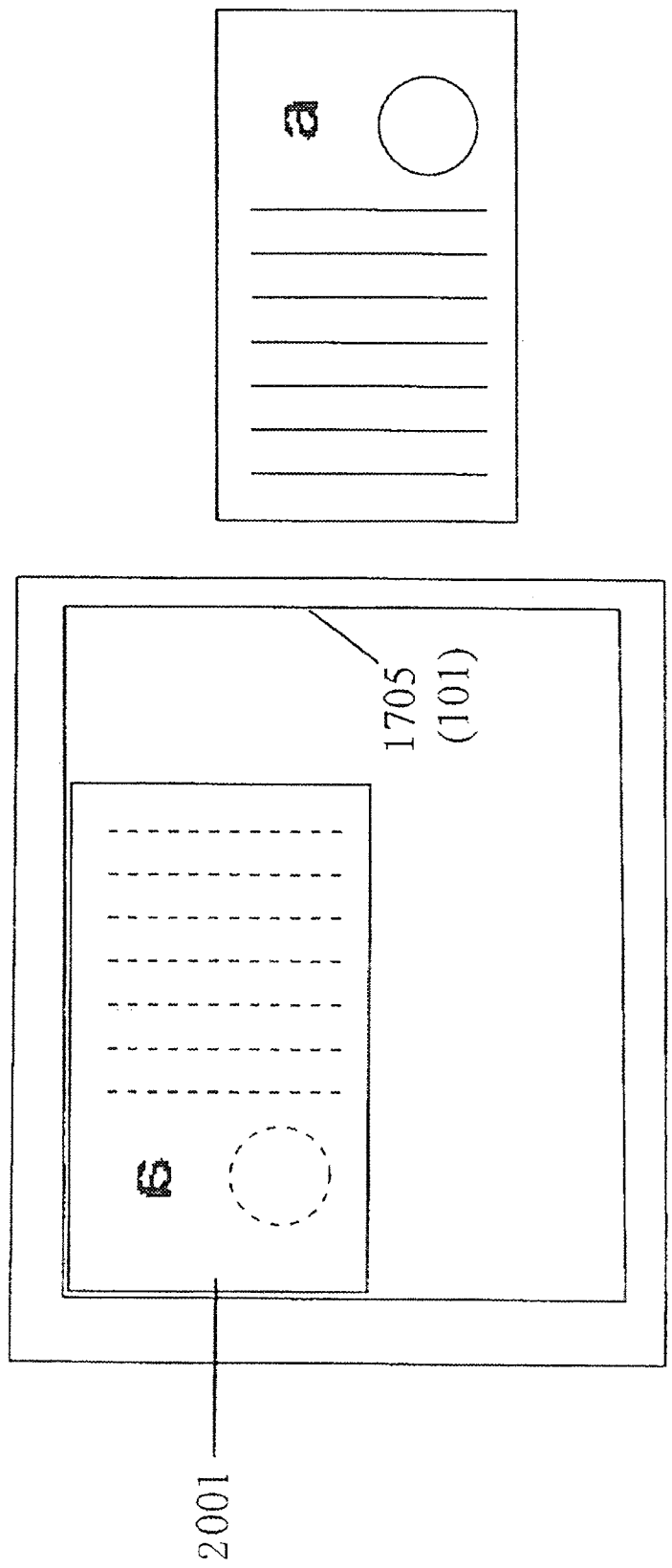
FIG. 20A is a diagram illustrating an example of a case according to the second embodiment, in which a laterally long original with text written vertically is placed in landscape orientation.
Figure 20B:
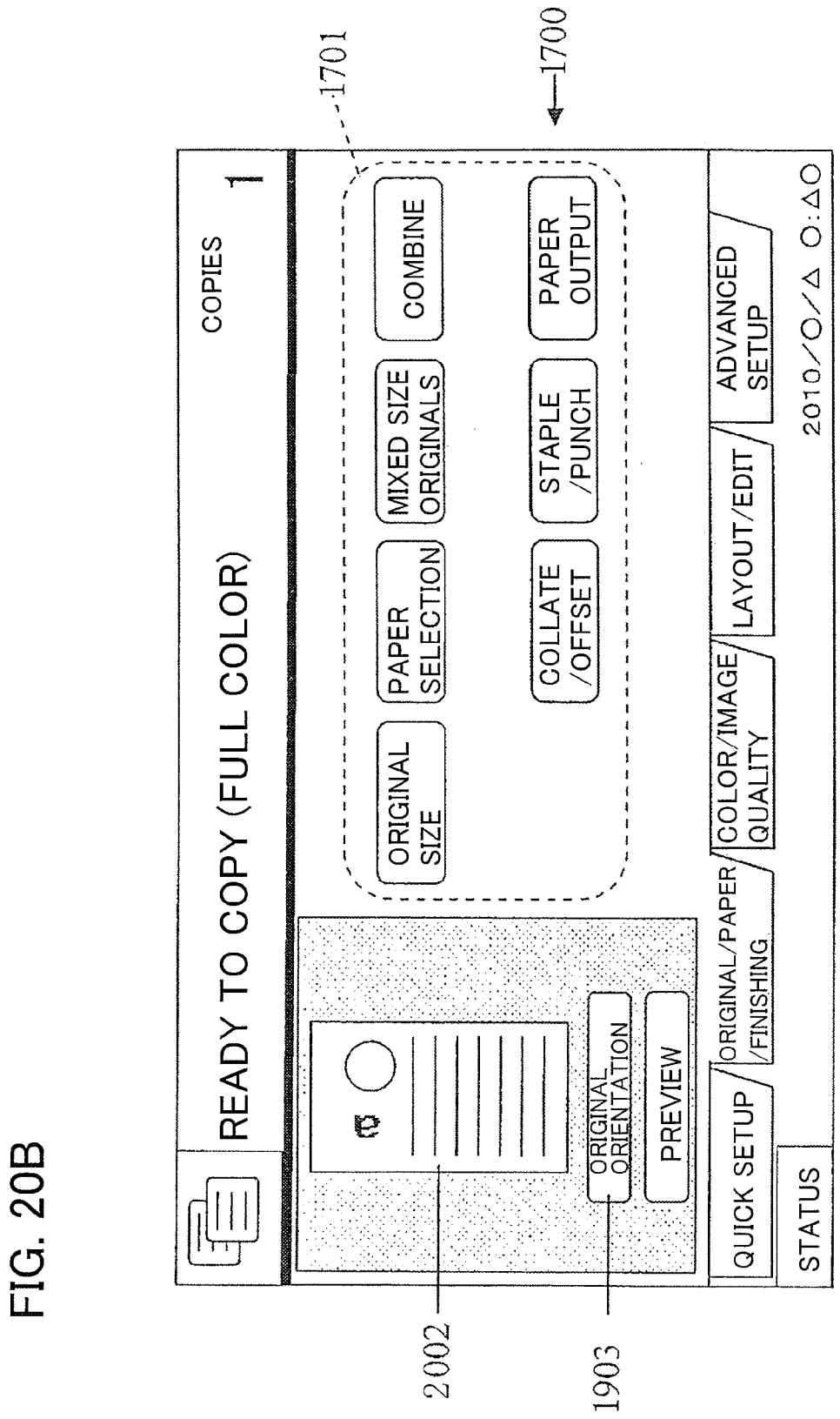
FIG. 20B is a diagram illustrating an example of a case according to the second embodiment, in which a preview image of a laterally long original with text written vertically is displayed in portrait orientation.

FIG. 20A is a diagram illustrating an example of a case according to the second embodiment, in which a laterally long original with text written vertically is placed in landscape orientation. FIG. 20B is a diagram illustrating an example of a case according to the second embodiment, in which a preview image of a laterally long original with text written vertically is displayed in portrait orientation.

On the other hand, as shown in FIGS. 20A and 20B, in a case in which a laterally long original 2001 with text written vertically is placed on the platen 101 in landscape orientation and the preview image 2002 corresponding thereto is displayed in portrait orientation with the orientation setting information "Top Edge Left", text lines in the preview image 2002 that should be displayed vertically are displayed laterally. In such a case, contents of the preview image 2002 are difficult for the user to confirm and it is obvious that the display orientation of the preview image is inappropriate.

In this case, if the user selects the orientation change key 1903 (FIG. 16; S1207YES) while looking at the preview image 2002, the change acceptance unit 1410 accepts the selection of the orientation change key 1803 and notifies a setting acceptance unit 1411 of the selection.

In response to the notification, the setting acceptance unit 1411 changes a background color of the orientation change key 1903 (for example, white) to a color (for example, gray) different from background color of other keys, and selectably displays a predetermined number of orientation setting keys, which is for defining various display orientations for display of the preview image, on the touch screen 201A.

FIG. 21A is a diagram illustrating an example of a predetermined number of orientation setting keys being displayed, according to the second embodiment.

As shown in FIG. 21A, in the vicinity of a right side of the preview image 2002: a message 2101 for prompting a user to change the display orientation of the preview image; an orientation setting key 2102 indicating a current display orientation of the preview image (for example, "Top Edge Left" corresponding to the preset orientation setting information); an orientation setting key 2103 indicating another display orientation (for example, "Top Edge Top" key corresponding to another orientation setting information); and an OK key 2004 are displayed.

As a result, the user can correctly confirm the current display orientation of the preview image and easily understand which orientation setting key should be selected.

If the user selects a specific orientation setting key 2103 ("Top Edge Top" key) (FIG. 16; S1209YES) while looking at the preview image 2002, the setting acceptance unit 1411 accepts the selection of the orientation setting key 2103 and notifies the display orientation change unit 1412 of the selection.

In response to the notification, the display orientation changing unit 1412 changes the display orientation of the preview image 2002 being displayed to the display orientation defined by the orientation setting key 2103 being selected (orientation setting information "Top Edge Top") (FIG. 6; S1210).

The preview image 2002 currently displayed corresponds to the orientation setting information "Top Edge Left", and has the origin of the image data as an upper left corner; an X axis direction as a down direction; and a Y axis direction as a right direction.

Given this, the display orientation changing unit 1412 makes the preview image correspond to the orientation setting information "Top Edge Top", have the origin as an upper right corner; an X axis direction of the image data as a left direction; and a Y axis direction of the image data as a down direction.

As a result, the preview image 2002 being displayed rotates 90 degrees clockwise.

In addition, display orientation of the preview image becomes the same as the placing orientation of the original and text lines are displayed vertically.

If the user selects the OK key 2104 (FIG. 16; S1211YES) while looking at the preview image in a new display orientation, the setting acceptance unit 1411 accepts the selection of the OK key 2104 and notifies the window display acceptance unit 1401 of the selection.

In response to the notification, the window display acceptance unit 1401 accepts the display orientation of the preview image (here, orientation setting information "Top Edge Top" corresponding to the orientation setting key thus selected) as the orientation of the image data for image processing (FIG. 6; S1212), and selectably displays the plurality of setting item keys again (FIG. 15; S1101).

Figure 21B:
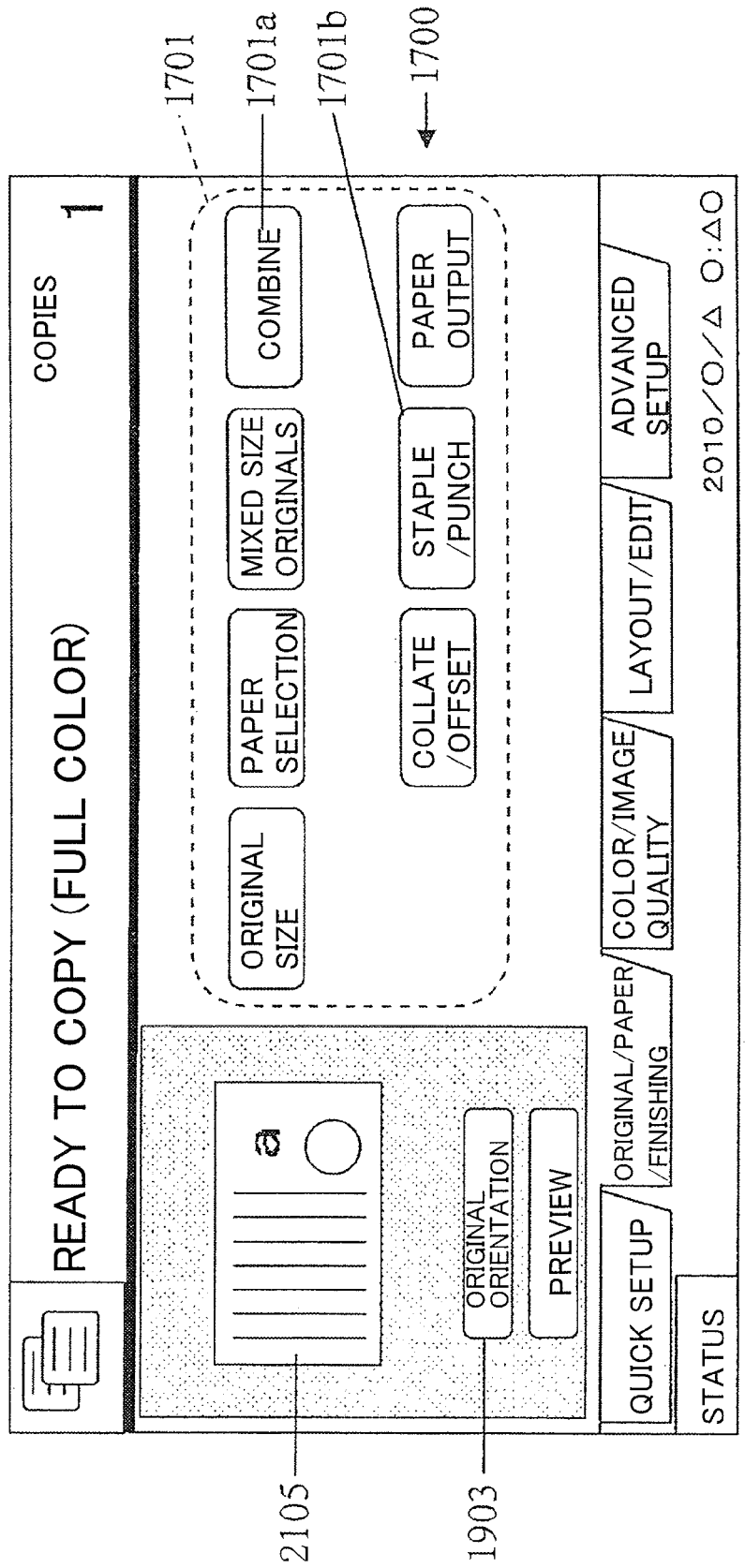
FIG. 21B is a diagram illustrating an example of a case according to the second embodiment, in which a preview image of a laterally long original with text written vertically is displayed in landscape orientation.

FIG. 21B is a diagram illustrating an example of a case according to the second embodiment, in which a preview image of a laterally long original with text written vertically is displayed in landscape orientation.

In the copy function window 1700, as shown in FIG. 21B, the preview image 2105 in the new display orientation, the orientation change key 1903, and the predetermined number of setting item keys 1701 are displayed.

Therefore, misunderstanding or confusion due to display mode of the preview image can be avoided and the user does not easily input inappropriate condition setting while looking at the preview image 2105.

As a result, in the multifunction peripheral 100A, the user can appropriately input condition setting, thereby suppressing input of inappropriate setting conditions by the user and miscopy.

Even in a case in which the user selects the OK key 2104 (FIG. 16; S1211YES) without selecting a specific orientation setting key 2103 (FIG. 16; S1209NO), as in the abovementioned case, the window display acceptance unit 1401 accepts the display orientation of the preview image being displayed, in other words the preset display orientation (for example "Top Edge Left") as the orientation of the image data (FIG. 16; S1212).

On the other hand, in a case in which the user does not select the OK key 2104 (FIG. 16; S1212NO), the processing returns to S1209 and the setting acceptance unit 1411 accepts the selection of a specific orientation setting key 2103 by the user (FIG. 16; S1209).

When the user selects the combine key 1701a while looking at the preview image shown in FIG. 21B (FIG. 15; S1103YES), the window display acceptance unit 1401 accepts the selection of the combine key 1701a and adjusts to the display orientation of the preview image (portrait), and displays setting item keys relating to combine on the touch screen 201A at a position where the setting item key can be more preferentially selected by a user than other setting item keys.

FIG. 22A is a diagram illustrating an example of a window displaying the setting item keys for combine according to the second embodiment.

Figure 22B:
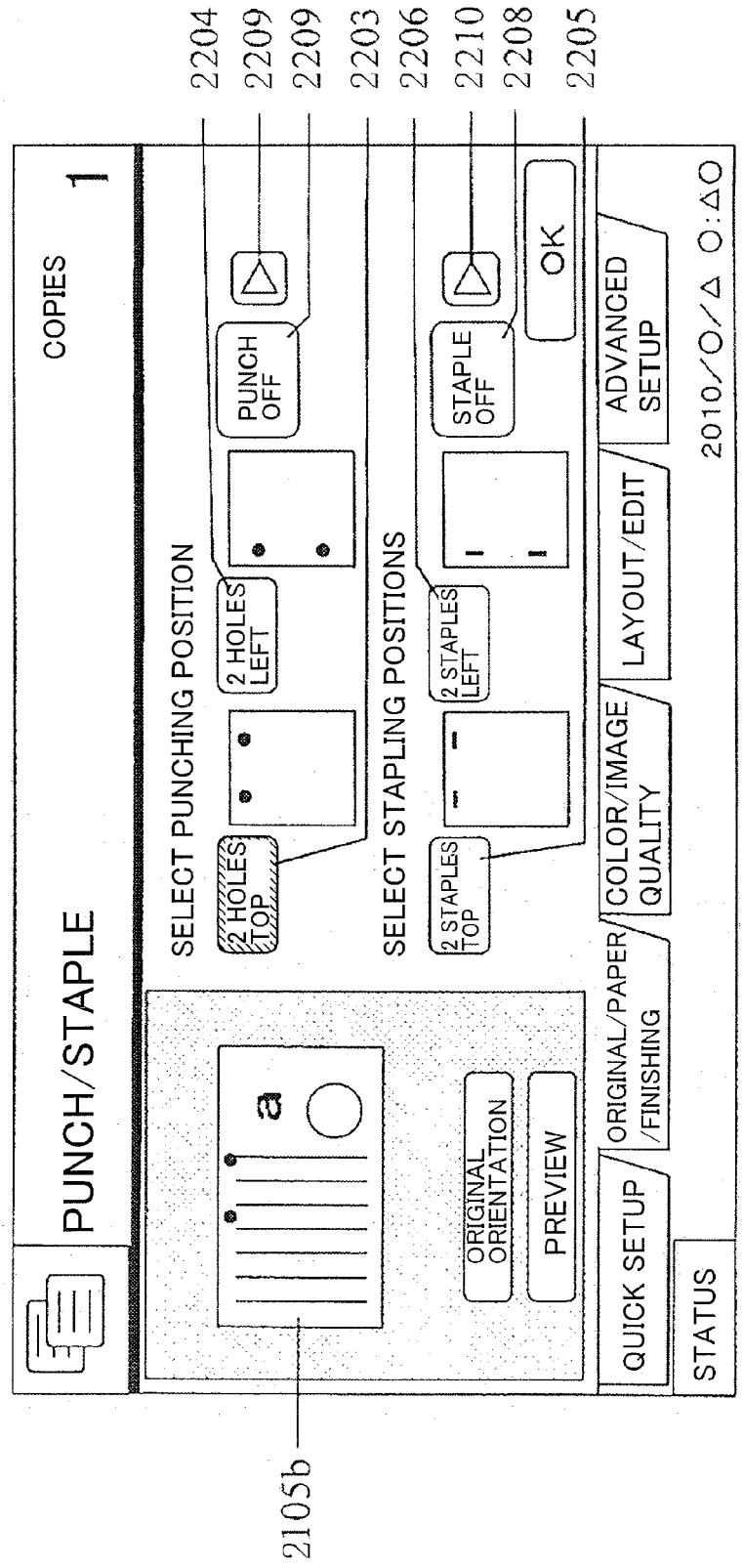
FIG. 22B is a diagram illustrating an example of a window displaying the setting item key for punch/staple according to the second embodiment.

For example, as shown in FIG. 22B, when the display orientation of the preview image is landscape orientation, the setting item key suitable for landscape orientation, more specifically a "Vertical 2 in 1 Combine" key 2201 for vertically arranging and combining two pieces of image data into single image data, is selectably displayed in a central portion that is easily selected by the user. As a position easily selected by the user, a region in the vicinity of the preview image can also be exemplified.

This setting item key is suitable for combining two pieces of image data in landscape orientation into one.

On the other hand, the setting item key not suitable for image data in landscape orientation, more specifically a "Lateral 2 in 1 Combine" key 2202 for laterally arranging and combining two pieces of image data into single image data, is selectably displayed in a side portion that is not easily selected by the user.

This can smoothly encourage the user to input the setting conditions and can suppress inappropriate input of the setting conditions and miscopy y in the multifunction peripheral 100A.

For example, if the user selects the "Vertical 2 in 1 Combine" key 2201, the window display acceptance unit 1401 displays the preview image 2105a reflecting the setting of "Vertical 2 in 1 Combine".

In addition to a "2 in 1" key including the "Vertical 2 in 1 Combine" key 2201 and the "Lateral 2 in 1 Combine" key 2202, setting item keys such as an "Combine Off" key, a "4 in 1" key, and an "8 in 1" key are displayed.

In addition, when the user selects a Punch/Staple key 1701b while looking at the preview image 2105 shown in FIG. 21B, the window display acceptance unit 1401 accepts the selection of the Punch/Staple key 1701b and adjusts to the display orientation of the preview image (landscape), and displays setting item keys relating to Punch/Staple at a position where the setting item key can be more preferentially selected by a user than other setting item keys.

FIG. 22B is a diagram illustrating an example of a window displaying the setting item keys for punch/staple according to the second embodiment.

For example, as shown in FIG. 22B, if the display orientation of the preview image is landscape orientation, setting item keys applicable for landscape orientation are displayed.

More specifically, in a case of punch, a "2 holes Top" key 2203 for punching 2 holes in an upper edge of a landscape-oriented original is displayed in a central portion and a "2 holes Left" key 1204 for punching 2 holes in a left edge of a landscape-oriented original is displayed in a side portion.

In a case of staple, a "2 staples top" key 2205 for stapling two points in an upper edge of a landscape-oriented original and a "2 staples left" key 2206 for stapling two points in a left edge of a landscape-oriented original are displayed.

As in the above description, this can smoothly encourage the user to input the setting conditions and can prevent inappropriate input of the setting conditions and miscopy in the multifunction peripheral 100A.

For example, if the user selects the "2 holes top" key 2203, the window display acceptance unit 1401 displays a preview image 2105b reflecting setting of "2 holes top".

In addition to the "2 holes top" key 2203, the "2 holes left" key 2204, the "2 staples top" key 2205 and the "2 staples left" key 2206, setting item keys relating to punch/staple: a "punch off" key 2207; a "staple off" key 2208; and shift keys 2209, 2210 displayed both in punch and staple functions, are displayed. If the shift keys 2209, 2210 are selected, other setting item keys are selectably displayed.

And then, when the user selects the start key 1205 while looking at the copy function window 1700 (FIG. 15; S1105YES), the window display acceptance unit 1401 accepts the selection of the start key 1205 and notifies the control unit 1402 of the multifunction peripheral of the selection.

In response to the notification, the control unit 1402 instructs the image forming unit 1413 to perform image formation based on the setting conditions accepted before the selection of the start key 1205.

In response to the instruction, the image forming unit 1413 executes image formation based on the setting conditions (FIG. 15; S1106).

Here, in the setting conditions, the display orientation of the preview image (for example, "Top Edge Top" corresponding to the landscape orientation) is defined as the orientation of the image data (for image formation).

Given this, the image forming unit 1413 acquires image data from the image data storage unit 1404 and adjusts the orientation of the image data to the display orientation of the preview image based on the orientation setting information (for example, "Top Edge Top").

For example, the image forming unit 1413 defines, if the display orientation of the preview image is "Top Edge Top", the origin of the image data as an upper right corner; an X axis direction of the image data as a left direction; and a Y axis direction of the image data as a down direction.

Thereafter, the image forming unit 1413 executes image formation based on the image data.

As a result, if the user inputs the setting conditions while looking at the preview image, the setting conditions are correctly reflected on the image formation.

The user can thus obtain a printed matter according to the preview image, in other words a desired printed matter.

In addition, miscopy can thus be prevented.

It should be noted that, in step S1102, if the user selects a predetermined setting item key 701 in the copy function window 700 (FIG. 15; S1103YES) without selecting the preview key 1702 (FIG. 15; S1102NO), the window display acceptance unit 401 accepts the selection of the setting item key 701 (FIG. 15: S1104).

This applies to a case in which there is no need of inputting setting conditions using a preview image, for example a case in which a user wishes to simply output a copy by placing an original on the platen 101 and selecting the start key 205.

In addition, in step S1105, if the user does not select the start key 205 (FIG. 15; S1105NO), processing returns to S1102 where the window display acceptance unit 401 accepts the selection of the preview key (FIG. 15: S1102) and the selection of the setting item key (FIG. 15; S1103).

As described above, the operation unit 102A acquires image data from an image reading device including a platen on which an original is placed in a predetermined placing orientation such that a target surface faces the platen, the image reading device reading an image on the target surface and generating image data, and includes: the touch screen 201A that displays, in a preset display orientation, a preview image acquired from image data of the original being placed in a predetermined placing orientation;
the orientation determination unit 1409 that determines, upon display of the preview image on the touch screen 201, whether the display orientation of the preview image is the same as the placing orientation of the original; the change acceptance unit 1410 that selectably displays, on the touch screen, an orientation change key for changing the display orientation of the preview image in a case in which the orientation determination unit 1409 determines that the display orientation of the preview image is not the same as the placing orientation of the original; the setting acceptance unit 1411 that selectably displays, on the touch screen 210A, at least one orientation setting key for setting the display orientation of the preview image when the orientation change key is selected; and the display orientation changing unit 1412 that, when a predetermined orientation setting key is selected, changes the display orientation of the preview image to the display orientation defined by the orientation setting key.

In such a configuration, in a case in which the display orientation of the preview image is not the same as the placing orientation of the original, the multifunction peripheral 100A can change the display orientation of the preview image according to the orientation of text lines (for example, vertical or lateral) in the preview image if a user selects the orientation change key.

Since the user can input the setting conditions while looking at a properly displayed preview image, the multifunction peripheral can improve visibility and operability for the user.

Although the original orientation detection unit 1407 detects the placing orientation of the original by comparing the lateral length (in the X axis direction) with the vertical length (in the Y axis direction) of the image data in the second embodiment, the present invention is not limited thereto and the placing orientation can be detected by other methods.

For example, the original orientation detection unit 1407 can be configured to detect the placing orientation of the original based on a combination of ON/OFF signals from a plurality of original detection sensors installed in advance at predetermined positions on the platen 101.

In addition, as in the first embodiment, although the orientation setting information "Top Edge Top" and "Top Edge Left" are exemplified in the second embodiment, the present invention is not limited thereto and "Top Edge Right" and "Top Edge Down" can also be employed. Alternatively, rotational angle of a preview image can be shown as the orientation setting information.

Furthermore, in the first and second embodiments, operation and effect of the operation unit of the multifunction peripheral in processing of copy service have been described; however, the same operation and effect can be obtained in a facsimile transmission service, a printing service, and the like.

Moreover, in the first and second embodiments, the operation unit is applied to a multifunction peripheral; however, the same operation and effect can be obtained by applying the operation unit of the present invention to various image forming apparatuses, various image processing apparatuses, various image display apparatuses and the like.

Furthermore, although the operation unit is configured to include various units in the first and second embodiments, the present invention may be configured to provide a storage medium that stores programs realizing the various units. In such a configuration, the operation unit 102 or the multifunction peripheral 100 reads the programs, thereby realizing the respective units by the operation unit or the multifunction peripheral. In this case, the program itself that is read out of the storage medium may embody the operation and effect of the present invention. Alternatively, steps executed by the various units can be provided as methods stored in a hard disk.

What is claimed is:

1. An operation device comprising:
 a touch screen configured to display a setting item window displaying predetermined setting item keys and a preview image window displaying a preview image in a preset display orientation, the preview image corresponding to original image data in an orientation in which an original is placed and to display the setting item keys to be selectable by a user;
 an orientation setting information storage unit that stores orientation setting information including the preset display orientation of the preview image and a direction to which a top side of the original faces;
 a preview image display unit configured to cause the preview image to be displayed in the reset orientation corresponding to the orientation setting information on the preview image window;
 an orientation setting information acquisition unit that acquires the orientation setting information from the orientation setting information storage unit when the preview image is displayed on the preview image window in the preset display orientation;
 a tab display acceptance unit that displays a tab key to be selectable by the user on the preview image window, the tab key including the orientation setting information thus acquired;
 a display adjustment unit that displays the tab key seamlessly with the preview image on the touch screen, the tab key including the orientation setting information corresponding to the preset display orientation of the preview image thus displayed; and
 a display orientation changing unit that, when the tab display acceptance unit accepts a selection of a tab key, changes the preset display orientation of the preview image to a display orientation corresponding to the orientation setting information included in the tab key thus selected,
 wherein the orientation setting information storage unit is configured to store a first orientation setting information and a second orientation setting information, the first orientation setting information being representative of the top side of the original which faces upward and the second orientation setting information being representative of the top side of the original which faces left when the original is placed to undergo a reading process,
 wherein the preview image display unit is configured to cause the preview image to be displayed on the preview image window in the preset display orientation corresponding to the orientation setting information selected from the first orientation setting information and the second orientation setting information,
 wherein the orientation setting information acquisition unit is configured to acquire the first orientation setting information and the second orientation setting information, and
 wherein the tab display acceptance unit is configured to cause the first orientation setting information and the second orientation setting information to be displayed as tab keys on the preview image window.

2. The operation device according to claim 1 further comprising: a window display acceptance unit that accepts the orientation setting information corresponding to the preset display orientation of the preview image as information regarding orientation of image data in a case of performing a predetermined process.

3. The operation device according to claim 1, wherein the display adjustment unit displays a predetermined marker on the touch screen, at a reference position on the preview image corresponding to a reference position on the image data of the original.

4. The operation device according to claim 1, wherein an arrangement of combining a plurality of sets of image data is changed according to the preset display orientation of the preview image and is displayed on the touch screen.

5. An image forming apparatus comprising an image reading device including a platen including a reading reference point, on which an original is placed such that a target surface faces the platen, the image reading device reading an image on the target surface and generating image data and
 an operation device including:
 a touch screen configured to display a setting item window displaying predetermined setting item keys and a preview image window displaying a preview image in a preset display orientation, the preview image corresponding to original image data in an orientation in which the original is placed on the platen and to display the setting item keys to be selectable by a user;
 an orientation setting information storage unit that stores orientation setting information including the preset display orientation of the preview image and a direction to which a top side of the original faces;
 a preview image display unit configured to cause the preview image to be displayed in the preset orientation corresponding to the orientation setting information on the preview image window;
 an orientation setting information acquisition unit that acquires the orientation setting information from the orientation setting information storage unit when the preview image is displayed on the preview image window in the preset display orientation;
 a tab display acceptance unit that displays a tab key to be selectable by the user on the preview image window, the tab key including the orientation setting information thus acquired;
 a display adjustment unit that displays the tab key seamlessly with the preview image on the touch screen, the tab key including the orientation setting information corresponding to the preset display orientation of the preview image thus displayed; and a display orientation changing unit that, when the tab display acceptance unit accepts a selection of a tab key, changes the preset display orientation of the preview image to a display orientation corresponding to the orientation setting information included in the tab key thus selected, wherein the orientation setting information storage unit is configured to store a first orientation setting information and a second orientation setting information, the first orientation setting information being representative of the to side of the original which faces upward and the second orientation setting information being representative of the top side of the original which faces left when the original to undergo a reading process, wherein the preview image display unit is configured to cause the preview image to be displayed on the preview image window in the preset display orientation corresponding to the orientation setting information selected from the first orientation setting information and the second orientation setting information, wherein the orientation setting information acquisition unit is configured to acquire the first orientation setting information and the second orientation setting information, and wherein the tab display acceptance unit is configured to cause the first orientation setting information and the second orientation setting information to be displayed as tab keys on the preview image window.

6. The image forming apparatus according to claim 5 wherein the operation device further comprising: a window display acceptance unit that accepts the orientation setting information corresponding to the preset display orientation of the preview image as information regarding orientation of image data in a case of performing a predetermined process.

7. The image forming apparatus according to claim 5, wherein the display adjustment unit displays a marker indicating a reading reference position on the touch screen, at a reference position on the preview image corresponding to a reference position on the image data of the original.

8. The operation device according to claim 5, wherein an arrangement of combining a plurality of sets of image data is changed according to the preset display orientation of the preview image and is displayed on the touch screen.

9. An operation method of an operation device including: a touch screen configured to display a setting item window displaying predetermined setting item keys and a preview image window displaying a preview image in a preset display orientation, the preview image corresponding to original image data in an orientation in which an original is placed and to display the setting item keys to be selectable by a user; and an orientation setting information storage unit that stores orientation setting information including the preset display orientation of the preview image and a direction to which a top side of the original faces, the method comprising:

a preview image display step in which the operation device causes the preview image to be displayed in the preset orientation corresponding to the orientation setting information on the preview image window;

an orientation setting information acquisition step in which the operation device acquires the orientation setting information from the orientation setting information storage unit when the preview image is displayed on the preview image window in the preset display orientation;

a tab display acceptance step in which the operation device displays a tab key to be selectable by the user on the preview image window, the tab key including the orientation setting information thus acquired;

a display adjustment step in which the operation device displays the tab key seamlessly with the preview image on the touch screen, the tab key including the orientation setting information corresponding to the preset display orientation of the preview image thus displayed, a display orientation changing step in which, when the operation device accepts a selection of a tab key, the operation device changes the preset display orientation of the preview image to a display orientation corresponding to the orientation setting information included in the tab key thus selected, wherein the orientation setting information storage unit is configured to store a first orientation setting information and a second orientation setting information, the first orientation setting information being representative of the to side of the original which faces upward and the second orientation setting information being representative of the top side of the original which faces left when the original is placed to under a reading process, wherein the preview image display step is configured to cause the preview image to be displayed on the preview image window in the preset display orientation corresponding to the orientation setting information selected from the first orientation setting information and the second orientation setting information, wherein the orientation setting information acquisition step is configured to acquire the first orientation setting information and the second orientation setting information, and wherein the tab display acceptance step is configured to cause the first orientation setting information and the second orientation setting information to be displayed as tab keys on the preview image window.

10. An operation device that acquires image data from an image reading device including a platen on which an original is placed in a predetermined placing orientation such that a target surface faces the platen, the image reading device reading an image on the target surface and generating image data, the operation device comprising:

a touch screen that displays, in a preset display orientation, a preview image acquired from image data of the original being placed in the predetermined placing orientation;

an orientation setting information storage unit that stores orientation setting information including the preset display orientation of the preview image and a direction to which a top side of the original faces;

a preview image display unit configured to cause the preview image to be displayed in the reset orientation corresponding to the orientation setting information on the preview image window;

an original orientation detection unit configured to detect the placing orientation of the original placed on the platen;

a preview image orientation detection unit configured to detect the preset display orientation of the preview image;

an orientation determination unit that determines, upon display of the preview image on the touch screen, whether the preset display orientation of the preview image is the same as the predetermined placing orientation of the original based on signals delivered by the original orientation detection unit and the preview image orientation detection unit;

a change acceptance unit that displays an orientation change key for changing the preset display orientation of the preview image to be selectable by a user on the touch screen, in a case in which the orientation determination unit determines that the preset display orientation of the preview image is not the same as the predetermined placing orientation of the original;

a setting acceptance unit that displays at least one orientation setting key for setting the preset display orientation of the preview image to be selectable by the user on the touch screen, when the orientation change key is selected; and a display orientation changing unit that, when an orientation setting key is selected, changes the preset display orientation of the preview image to a display orientation defined by the orientation setting key, wherein the orientation setting information storage unit is configured to store a first orientation setting information and a second orientation setting information, the first orientation setting information being representative of the top side of the original which faces upward and the second orientation setting information being representative of the top side of the original which faces left when the original is placed to undergo a reading process, wherein the preview image display unit is configured to cause the preview image to be displayed on the preview image window in the preset display orientation corresponding to the orientation setting information selected from the first orientation setting information and the second orientation setting information, and wherein the setting acceptance unit is configured to cause the first orientation setting information and the second orientation setting information to be displayed as orientation setting keys on the preview image window.

11. The operation device according to claim 10 further comprising: a window display acceptance unit that accepts the orientation setting information corresponding to the preset display orientation of the preview image as information regarding orientation of image data in a case of performing a predetermined process.

12. The operation device according to claim 11, wherein the window display acceptance unit displays setting item keys relating to predetermined functions to be selectable by the user along with the preview image on the touch screen, and displays the setting item key corresponding to the preset display orientation of the preview image at a position where the setting item key can be more preferentially selected by the user than other setting item keys.

13. The operation device according to claim 10, wherein a arrangement of combining a plurality of sets of image data is changed according to the preset display orientation of the preview image and is displayed on the touch screen.

14. An image forming apparatus comprising: an image reading device including a platen on which an original is placed such that a target surface including a reading reference point faces the platen, the image reading device reading an image on the target surface and generating image data; and an operation device including:

a touch screen that displays a preview image acquired from image data of the original being placed in a predetermined placing orientation in a preset display orientation;

an orientation setting information storage unit that stores orientation setting information including the preset display orientation of the preview image and a direction to which a top side of the original faces;

a preview image display unit configured to cause the preview image to be displayed in the preset orientation corresponding to the orientation setting information on the preview image window;

an original orientation detection unit configured to detect the placing orientation of the original placed on the platen;

a preview image orientation detection unit configured to detect the preset display orientation of the preview image;

an orientation determination unit that determines, upon display of the preview image on the touch screen, whether the preset display orientation of the preview image is the same as the predetermined placing orientation of the original based on signals delivered by the original orientation detection unit and the preview image orientation detection unit;

a change acceptance unit that displays an orientation change key for changing the preset display orientation of the preview image to be selectable by a user on the touch screen in a case in which the orientation determination unit determines that the preset display orientation of the preview image is not the same as the predetermined placing orientation of the original;

a setting acceptance unit that displays at least one orientation setting key for setting the preset display orientation of the preview image to be selectable by the user on the touch screen when the orientation change key is selected; and a display orientation changing unit that, when an orientation setting key is selected, changes the preset display orientation of the preview image to a display orientation defined by the orientation setting key, wherein the orientation setting information storage unit is configured to store a first orientation setting information and a second orientation setting information, the first orientation setting information being representative of the top side of the original which faces upward and the second orientation setting information being representative of the top side of the original which faces left when the original is placed to undergo a reading process, wherein the preview image display unit is configured to cause the preview image to be displayed on the preview image window in the preset display orientation corresponding to the orientation setting information selected from the first orientation setting information and the second orientation setting information, and wherein the setting acceptance unit is configured to cause the first orientation setting information and the second orientation setting information to be displayed as orientation setting keys on the preview image window.

15. The image forming apparatus according to claim 14 wherein the operation device further comprising: a window display acceptance unit that accepts the orientation setting information corresponding to the preset display orientation of the preview image as information regarding orientation of image data in a case of performing a predetermined process.

16. The image forming apparatus according to claim 15, wherein the window display acceptance unit displays setting item keys relating to predetermined functions to be selectable by the user along with the preview image on the touch screen, and displays the setting item key corresponding to the preset display orientation of the preview image at a position where the setting item key can be more preferentially selected by the user than other setting item keys.

17. The operation device according to claim 14, wherein an arrangement of combining a plurality of sets of image data is changed according to the preset display orientation of the preview image and is displayed on the touch screen.

18. An operation method of an operation device that acquires image data from an image reading device including a platen on which an original is placed in a predetermined placing orientation such that a target surface faces the platen, the image reading device reading an image on the target surface and generating image data, and includes a touch screen that displays a preview image acquired from image data of the original being placed in a predetermined placing orientation in a preset display orientation, and an orientation setting information storage unit that stores orientation setting information including the preset display orientation of the preview image and a direction to which a top side of the original faces, the operation method comprising:

a preview image display step in which the operation unit causes the preview image to be displayed in the preset orientation corresponding to the orientation setting information on the preview image window;

an orientation setting information acquisition step in which the operation device acquires the orientation setting information from the orientation setting information storage unit when the preview image is displayed on the preview image window in the preset display orientation;

an original orientation detection step in which the operation device detects the placing orientation of the original placed on the platen;

a preview image orientation detection step in which the operation device detects the preset display orientation of the preview image;

an orientation determination step in which the operation device determines, upon display of the preview image on the touch screen, whether the preset display orientation of the preview image is the same as the predetermined placing orientation of the original based on signals delivered in the original orientation detection step and the preview image orientation detection step;

a change acceptance step in which the operation device displays an orientation change key for changing the preset display orientation of the preview image to be selectable by a user on the touch screen in a case in which the preset display orientation of the preview image is determined not to be the same as the predetermined placing orientation of the original in the orientation determination step;

a setting acceptance step in which the operation device displays a predetermined number of orientation setting keys for setting the preset display orientation of the preview image to be selectable by the user on the touch screen when the orientation change key is selected; and a display orientation changing step in which the operation device, when an orientation setting key is selected, changes the preset display orientation of the preview image to a display orientation defined by the orientation setting key, wherein the orientation setting information storage unit is configured to store a first orientation setting information and a second orientation setting information, the first orientation setting information being representative of the top side of the original which faces upward and the second orientation setting information being representative of the top side of the original which faces left when the original is placed to undergo a reading process, wherein the preview image display step is configured to cause the preview image to be displayed on the preview image window in the preset display orientation corresponding to the orientation setting information selected from the first orientation setting information and the second orientation setting information, and wherein the setting acceptance step is configured to cause the first orientation setting information and the second orientation setting information to be displayed as the orientation setting keys on the preview image window.

* * * * *